US007386799B1

(12) United States Patent
Clanton et al.

(10) Patent No.: US 7,386,799 B1
(45) Date of Patent: Jun. 10, 2008

(54) CINEMATIC TECHNIQUES IN AVATAR-CENTRIC COMMUNICATION DURING A MULTI-USER ONLINE SIMULATION

(75) Inventors: Charles H. Clanton, San Francisco, CA (US); Jeffrey J. Ventrella, San Francisco, CA (US); Fernando J. Paiz, Millbrae, CA (US)

(73) Assignee: Forterra Systems, Inc., San Mateo, CA (US)

( * ) Notice: Subject to any disclaimer, the term of this patent is extended or adjusted under 35 U.S.C. 154(b) by 771 days.

(21) Appl. No.: 10/409,745

(22) Filed: Apr. 8, 2003

Related U.S. Application Data

(60) Provisional application No. 60/428,545, filed on Nov. 21, 2002.

(51) Int. Cl.
*G06F 3/00* (2006.01)
*G06F 3/048* (2006.01)
(52) U.S. Cl. .................. 715/758; 715/753; 715/861
(58) Field of Classification Search ............ 715/715, 715/753, 757, 758, 706, 861, 863
See application file for complete search history.

(56) References Cited

U.S. PATENT DOCUMENTS

| 5,261,041 A | 11/1993 | Susman |
| 5,267,154 A | 11/1993 | Takeuchi et al. |
| 5,347,306 A | 9/1994 | Nitta |
| 5,483,630 A | 1/1996 | Unuma et al. |
| 5,546,518 A | 8/1996 | Blossom et al. |
| 5,577,185 A | 11/1996 | Tunnell et al. |
| 5,736,982 A | 4/1998 | Suzuki et al. |
| 5,742,329 A * | 4/1998 | Masunaga et al. ....... 348/14.07 |
| 5,880,731 A * | 3/1999 | Liles et al. .................. 715/758 |
| 5,907,328 A * | 5/1999 | Brush, II et al. ........... 715/863 |
| 6,119,147 A * | 9/2000 | Toomey et al. ............. 709/204 |
| 6,154,222 A | 11/2000 | Haratsch et al. |
| 6,285,392 B1 | 9/2001 | Satoda et al. |
| 6,330,022 B1 | 12/2001 | Seligmann |
| 6,331,853 B1 | 12/2001 | Miyashita |
| 6,331,861 B1 | 12/2001 | Gever et al. |
| 6,346,956 B2 | 2/2002 | Matsuda |
| 6,359,622 B1 | 3/2002 | Hayes-Roth |
| 6,396,509 B1 * | 5/2002 | Cheng ........................ 715/706 |
| 6,404,438 B1 | 6/2002 | Hatlelid et al. |
| 6,466,213 B2 | 10/2002 | Bickmore et al. |
| 6,466,215 B1 | 10/2002 | Matsuda et al. |
| 6,483,878 B1 | 11/2002 | Yonezawa et al. |
| 6,535,215 B1 | 3/2003 | DeWitt et al. |
| 6,559,863 B1 * | 5/2003 | Megiddo ..................... 715/758 |

(Continued)

OTHER PUBLICATIONS

AVJ Natural Cat, "Cat95", retrieved on Mar. 11, 2003 from the Internet at <URL:http://web.archive.org/web/*/http://www.naturalcat.com, 5 pages.

(Continued)

*Primary Examiner*—Weilun Lo
*Assistant Examiner*—Truc T. Chuong
(74) *Attorney, Agent, or Firm*—Perkins Coie LLP

(57) ABSTRACT

A method and apparatus for avatar-centric communication, expression and display during a multi-user online simulation are described. Various techniques are introduced to increase the richness and realism of avatar interactions, including the use of "Chat Balloons", "Chat Props", cinematic techniques, avatar non-verbal communication, and gaze control.

2 Claims, 37 Drawing Sheets

U.S. PATENT DOCUMENTS

| | | |
|---|---|---|
| 6,570,555 B1 | 5/2003 | Prevost et al. |
| 6,753,857 B1 | 6/2004 | Matsuura et al. |
| 6,772,195 B1 * | 8/2004 | Hatlelid et al. ............ 715/753 |
| 6,853,398 B2 | 2/2005 | Malzbender et al. |
| 7,006,098 B2 | 2/2006 | Bickmore et al. |
| 7,007,235 B1 | 2/2006 | Hussein et al. |
| 7,116,284 B2 | 10/2006 | Kato et al. |
| 7,124,372 B2 | 10/2006 | Brin |
| 7,139,767 B1 | 11/2006 | Taylor et al. |
| 7,146,095 B2 | 12/2006 | Asami |
| 2002/0005865 A1 | 1/2002 | Hayes-Roth |
| 2002/0008716 A1 | 1/2002 | Colburn et al. |
| 2002/0097267 A1 | 7/2002 | Dinan et al. |
| 2002/0140732 A1 | 10/2002 | Tveskov |
| 2002/0175990 A1 | 11/2002 | Martino et al. |
| 2003/0117487 A1 | 6/2003 | Monroe |
| 2003/0151658 A1 | 8/2003 | Smith |
| 2003/0156135 A1 | 8/2003 | Lucarelli |
| 2003/0233650 A1 | 12/2003 | Zaner et al. |
| 2004/0053690 A1 | 3/2004 | Fogel et al. |
| 2004/0100553 A1 | 5/2004 | Allen et al. |
| 2004/0191477 A1 | 9/2004 | Davis et al. |
| 2004/0196360 A1 | 10/2004 | Hillis et al. |
| 2005/0005247 A1 | 1/2005 | Kamachi et al. |
| 2005/0015725 A1 | 1/2005 | Matsuda |
| 2005/0086605 A1 | 4/2005 | Ferrer et al. |
| 2006/0064645 A1 | 3/2006 | Neven et al. |
| 2006/0074689 A1 | 4/2006 | Cossato et al. |
| 2006/0170945 A1 | 8/2006 | Bill |
| 2007/0101276 A1 | 5/2007 | Yuen |
| 2007/0159523 A1 | 7/2007 | Hillis et al. |

OTHER PUBLICATIONS

Lauder, J., "To Deceive Is To Enchant: Programmable Animation," Game Developer, May 2000, pp. 15-16, 18 and 20.

* cited by examiner

CINEMATIC TECHNIQUES IN AVATAR-CENTRIC COMMUNICATION DURING A MULTI-USER ONLINE SIMULATION

This application claims the benefit of U.S. Provisional Patent application No. 60/428,545, filed on Nov. 21, 2002, and entitled, "Avatar-Centric Communication, Expression and Visual Depiction," which is incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the patent and Trademark Office patent file or records, but otherwise reserves all copyright rights whatsoever.

FIELD OF THE INVENTION

At least one embodiment of the present invention pertains to network-based simulations, and more particularly, to techniques for avatar-centric communication, expression and display during a multi-user online simulation.

BACKGROUND

Computer games and arcade games often feature animated, user-controlled characters which represent human users and which appear human or humanoid. These characters are referred to as "avatars". Currently, there is growing interest in creating an on-line community in which people are represented by avatars and can interact with each other in a virtual world (a simulated environment) through their avatars in a realistic manner. Ideally, the virtual world will provide sufficient "richness" so that the avatars can interact with each other and their virtual environment in much the same way people interact in the real world. The availability of the Internet makes such a virtual world potentially accessible to millions of users. Such a virtual world may impact many areas of everyday life, including communications, entertainment, commerce, and education, to name just a few. The usefulness and success of an avatar-based virtual community will depend largely on the sophistication and realism of the avatars and the ways in which they can interact. Users will want to use and participate in such applications only if their avatars are realistic and sophisticated in their capabilities.

While users of a virtual world may want to engage in various activities, such as racing a car or flying around the world in a plane, one of the most compelling and desired activities is communicating with other users. Thus, one of the principal features common to known three-dimensional (3D) worlds is the ability for different users of the world to communicate with one another, through text chat. In known 3D worlds, conversation has been presented in a way that is no different from online text conversations without a 3D world, using instant messaging and email, where text is presented in a 2D window, separating it from the 3D world. Known 3D virtual worlds do not provide avatars with body language, facial and gestural expression, or 3D symbolic visuals for user-to-user communication. To provide users with a rich user experience in a virtual world, it is desirable to make avatars' faces and bodies important components in user-to-user avatar communication, as in the real world.

BRIEF DESCRIPTION OF THE DRAWINGS

One or more embodiments of the present invention are illustrated by way of example and not limitation in the figures of the accompanying drawings, in which like references indicate similar elements and in which.

DETAILED DESCRIPTION

A method and apparatus for avatar-centric communication, expression and display during a multi-user online simulation are described. Note that in this description, references to "one embodiment" or "an embodiment" mean that the feature being referred to is included in at least one embodiment of the present invention. Further, separate references to "one embodiment" or "an embodiment" in this description do not necessarily refer to the same embodiment; however, such embodiments are also not mutually exclusive unless so stated, and except as will be readily apparent to those skilled in the art from the description. For example, a feature, structure, act, etc. described in one embodiment may also be included in other embodiments. Thus, the present invention can include a variety of combinations and/or integrations of the embodiments described herein.

Various techniques are introduced below to increase the richness and realism of avatar interactions during a multi-user online simulation. As will be described, these techniques include the use of "Chat Balloons", "Chat Props", cinematic techniques, avatar non-verbal communication, and gaze control.

I. Network Environment

Figure 1:
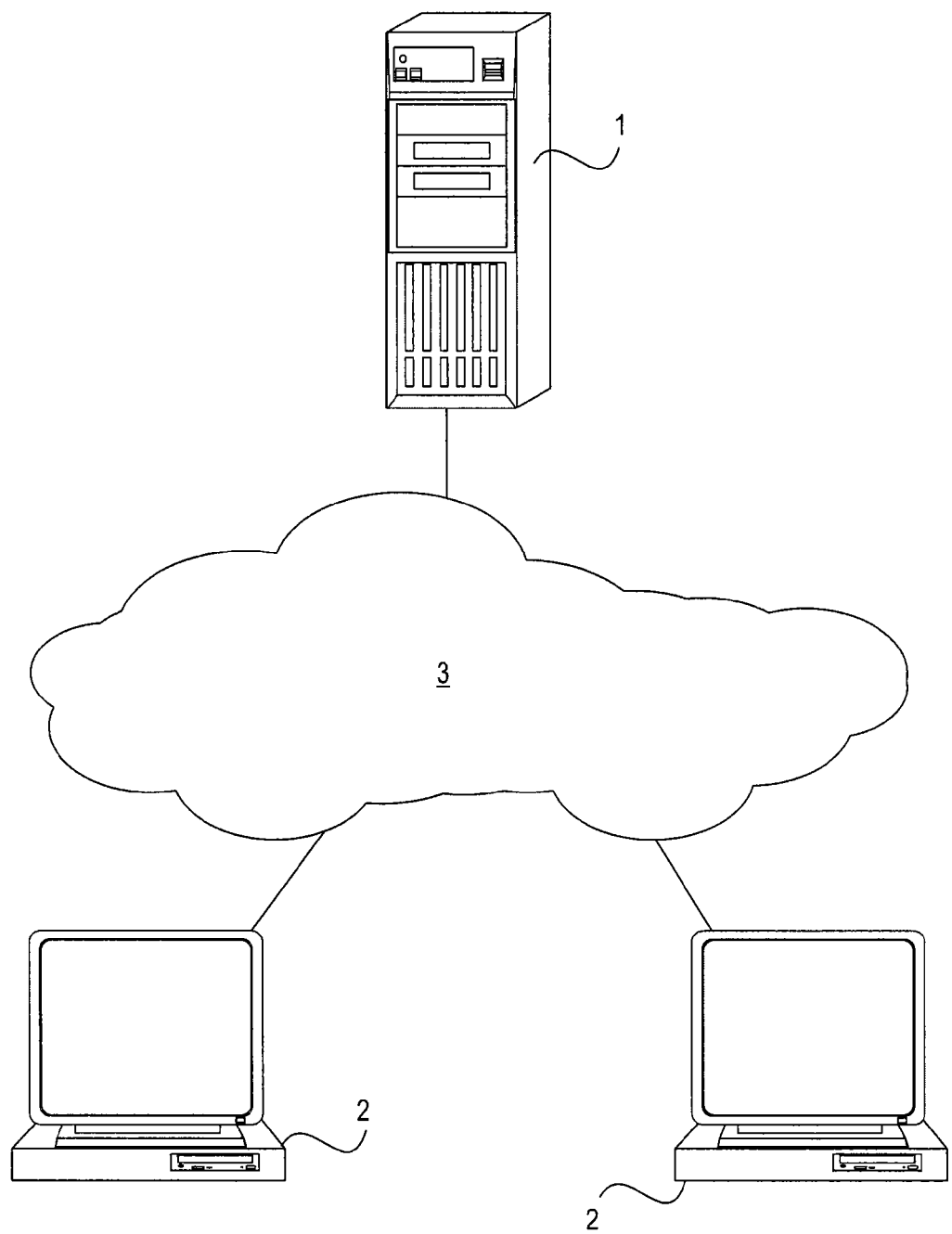
FIG. 1 illustrates a network environment in which the techniques can be implemented.

Before considering the avatar-centric techniques introduced herein, refer to FIG. 1, which illustrates a network environment in which the techniques can be implemented. The environment includes a server 1 which is coupled to a number N of clients 2 via a network 3. Although they are referred to separately herein, the server 1 and the clients 2 may be considered part of the network 3. Although only two clients 2 are shown, the number N of clients 2 is not restricted to any particular number for purposes of the present invention. Each of the clients 2 may be a conventional computer system, such as a personal computer (PC), a workstation, a set-top box, a console game system, or even a hand-held device such as a personal digital assistant (PDA), personal information manager (PIM), or the like. The server 1 may be, for example, a conventional server-class computer system or PC, or a combination of two or more such devices. The network 3 may be the Internet, a campus intranet, a wide area network (WAN), a local area network (LAN), or any other type of network or internetwork or combination thereof. Note that the present invention can be applied to networks that use any of a variety of communication techniques, including datagram based networks (e.g., the Internet), connection based (e.g., X.25) networks, virtual circuit based, e.g., Asynchronous Transfer Mode (ATM) networks, etc.

Note also that while FIG. 1 shows a client-server topology, in other embodiments, the techniques described below may be implemented using other topologies, such as a peer-to-peer topology. In addition, it will be recognized that certain aspects of the techniques described herein are normally implemented within a single machine or can be implemented in a single machine. Nonetheless, a client-server topology is assumed henceforth, to facilitate description.

During a simulation, each of the clients 2 maintains data representing a set of objects, representing real-world objects. These objects include avatars controlled by, and representing, the human users of the clients 2. Each machine maintains the same objects, however, the states of the objects may be computed at different times on each machine. Hence, in one embodiment, the server 1 maintains the "true" state of each object, i.e., the state which is considered to be the correct state of the object, and the server periodically distributes information regarding the true state of each object (including avatars) to the clients 2, based on inputs received from the clients 2. Note that in certain embodiments, the server 1 may be implemented in the same machine as one or more of the clients 2, at least for purposes of maintaining the true state of an object. However, for purposes of explanation, it is henceforth assumed that the server 1 is implemented in a separate machine on the network 3, as illustrated in FIG. 1. In addition, there may actually be more than one server 1; for example one server may maintain the true state of certain objects, while another server or servers maintain the true state of other objects or perform other server functions.

Figure 2:
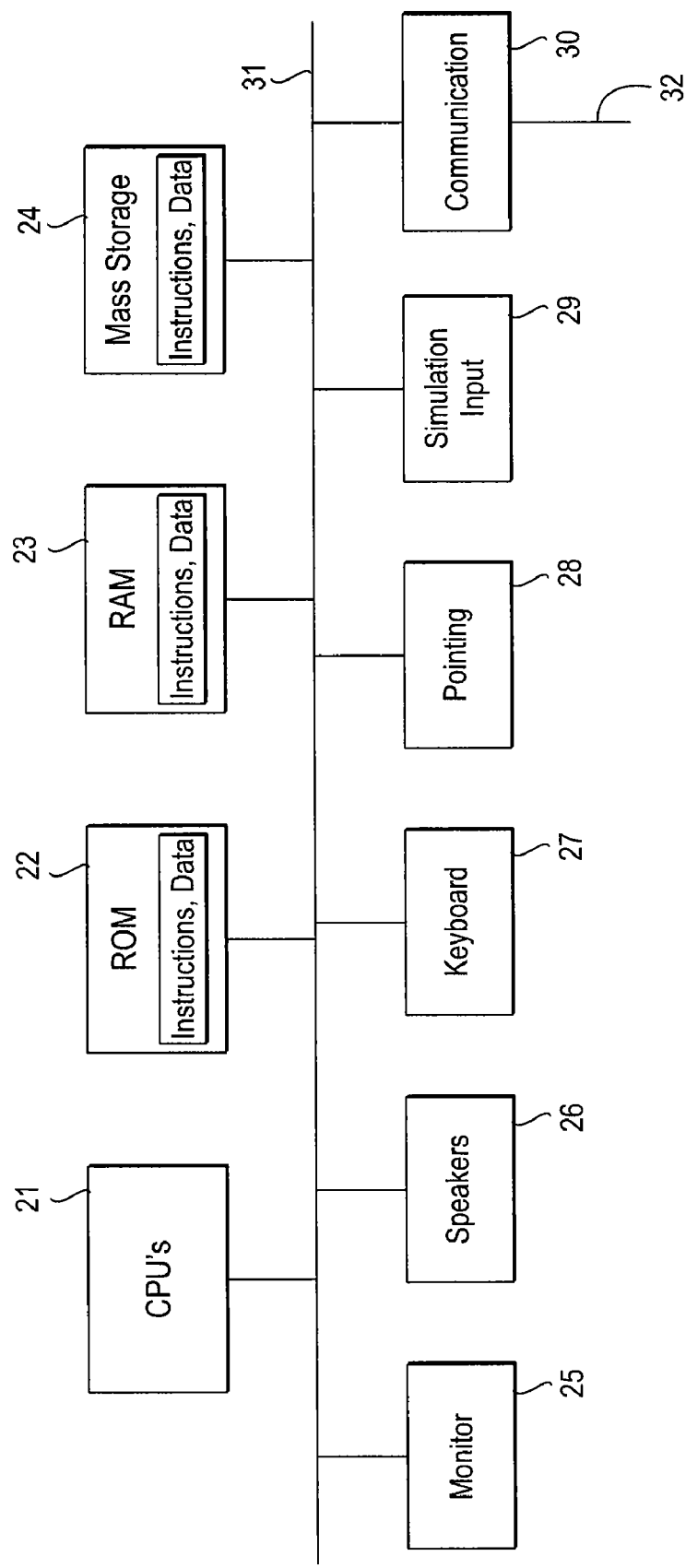
FIG. 2 is a high-level block diagram of a processing system that may represent any of the machines shown in FIG. 1.

FIG. 2 is a high-level block diagram of a processing system that may represent any of the machines shown in FIG. 1. The illustrated system includes one or more central processing units (CPUs) 21 (e.g., a microprocessor), read-only memory (ROM) 22, random access memory (RAM) 23, and a mass storage device 24, each connected to a bus system 31. The bus system 31 may include one or more buses connected to each other through various bridges, controllers and/or adapters, such as are well-known in the art. For example, the bus system 31 may include a system bus that is connected through an adapter and/or bus controller to one or more expansion buses, such as a Peripheral Component Interconnect (PCI) bus. Also coupled to the bus system 31 are a monitor (display device) 25, audio speakers 26, a keyboard 27, a pointing device 28, a simulation input device 29, and a communication device 30.

Mass storage device 24 may include any suitable device for storing large volumes of data, such as magnetic disk or tape, magneto-optical (MO) storage device, or any of various types of Digital Versatile Disk (DVD) or compact disk (CD) based storage device, flash memory etc. The monitor 25 may be any device suitable for displaying alphanumeric, graphical and/or video data to a user, such as a cathode ray tube (CRT), a liquid crystal display (LCD), or the like, and associated controllers. The pointing device 28 may be any suitable device for enabling a user to position a cursor or pointer on the monitor 25, such as a mouse, trackball, touchpad, joystick, or the like. The simulation input device 29 may be any device which receives user inputs to allow a user to control objects in a simulation (including avatars), such as a joystick or the like. Note, however, that the keyboard 27 and/or the pointing device 28 may also serve this same purpose, such that the simulation input device 29 may be omitted in certain embodiments. The communication device 30 may be any device suitable for enabling the computer system to communicate data with another processing system over a network via a communication link 32, such as a conventional telephone modem, a wireless modem, a cable modem, an Integrated Services Digital Network (ISDN) adapter, a Digital Subscriber Line (DSL) adapter, an Ethernet adapter, or the like.

Some of the above-mentioned components may not be present in certain embodiments of the invention, and certain embodiments of the invention may include additional or substitute components not mentioned above. For example, the server 1 may not require components such as a monitor, speakers, keyboard, pointing device, or simulation input device, if it does not receive any direct, local user input.

The techniques introduced herein can be implemented in software, which may be stored in, for example, RAM 23, mass storage device 24, ROM 22, or a combination thereof, in one or more of the processing systems represented in FIG. 1.

Figure 3:
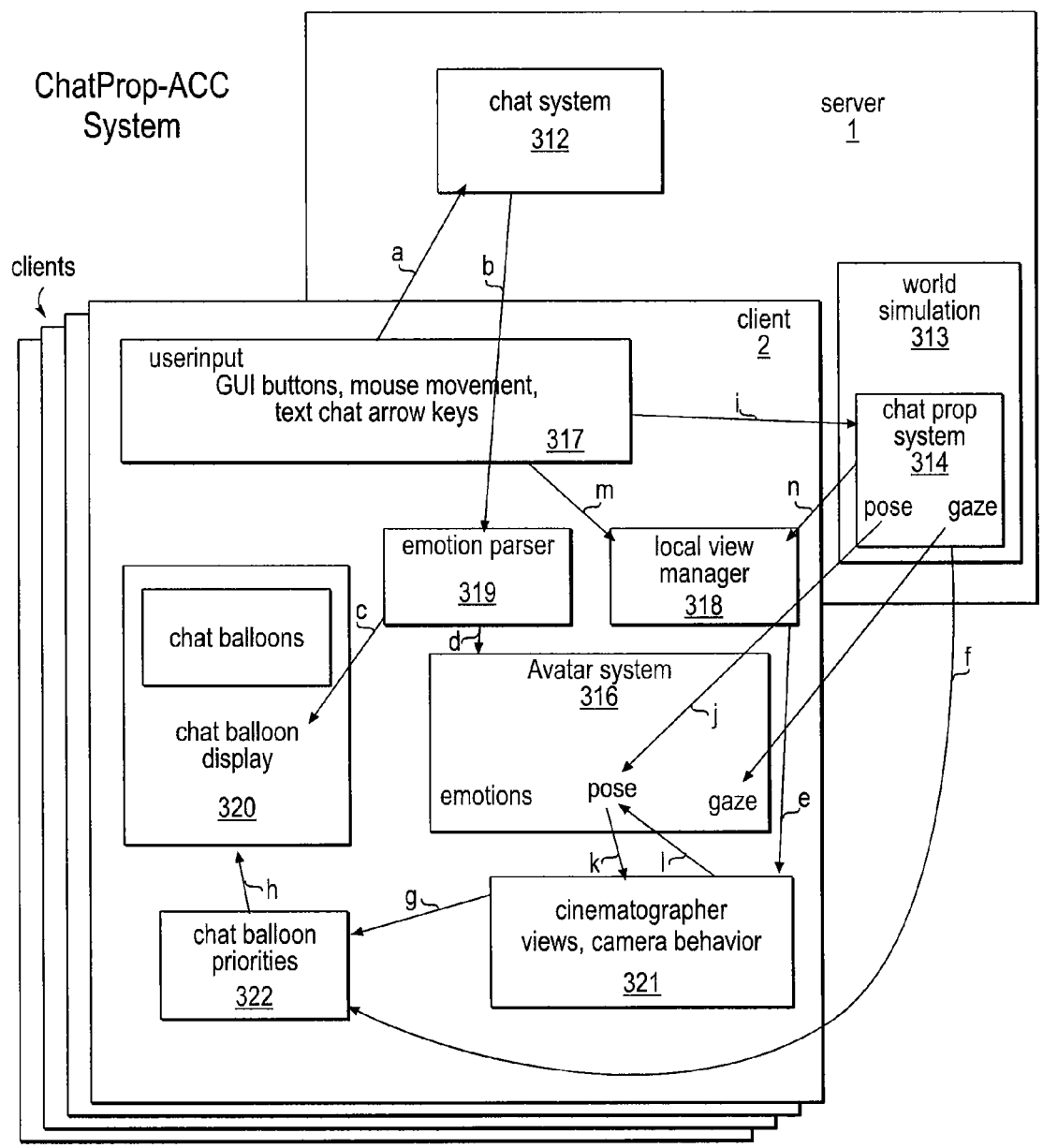
FIG. 3 is a block diagram of software on both a client and on a server to implement the avatar-related features and techniques described herein.

FIG. 3 is a block diagram of software, on both a client 2 and on a server 1 (see FIG. 1), that can be used to implement the avatar-related features and techniques described below. In the illustrated embodiment, the server software includes a chat system 312 and a world simulation 313. The world simulation 313 includes a Chat Prop system 314. The client software includes an avatar control system 316; a user input unit 317; a local view manager 318; an emotion parser 319; a Chat Balloon display unit 320, a cinematographer unit 321; and Chat Balloon priorities data 322. The client and server software are described further below (section "VII.").

II. Terminology

Various terms are used in this document to describe embodiments of the invention. Accordingly, the following definitions and explanations apply to terms used herein:

| | |
|---|---|
| Auto-Chat Prop | An invisible, furniture-less Chat Prop (see definition of "Chat Prop" below) that holds two or more avatars in a conversation. |
| Automatically | An action done "automatically" is an action initiated without any user input intended to cause such action. |
| Avatar-centric Communication | The general term for all techniques used for facilitating online communication among users, which is centered around avatar body language, in-world Chat Balloons, camera behavior, and expressions, typically coordinated by Chat Props. |
| Bubbling moodicon | A moodicon (see definition of "moodicon" below) that moves upward from the pilot avatar. |
| Camera | A user viewpoint during a simulation, i.e., a location within the virtual world from which the user can view the virtual world; a virtual camera, unless expressly stated otherwise. |
| Chat Prop | A prop that facilitates avatar-based chat between users; typically, a set of one or more furniture items around which avatars can sit to hold a conversation (e.g. a living room with a sofa and two chairs). Various automated features help to facilitate conversation, such as cameras, gaze, and Chat Balloon behaviors. |
| Chat Balloon | A comic-book-like bubble or other similar shape containing text, which appears above an avatar's head when its user types text. This is distributed and so other users can see this. |
| Conversational Act | Any act by an avatar that relates to, or occurs within the context of, user-to-user communication through avatars, such as speech, a facial expression, a body gesture, or a moodicon by an avatar. |
| Facial Expression | A user-triggered avatar animation involving the face, head, and neck. |
| Gaze | As a verb: to look at someone or something. As a noun: an act or state of gazing. |
| Gesture | A user-triggered avatar animation involving the body, not including the face. |
| Goal Orientation | A user-input controlled direction towards which the avatar attempts to gaze and/or walk (also used for driving vehicles). |
| LookAt | A state in which an avatar's gaze is locked onto another avatar's head, or some other object of interest. |
| LookAt target | An avatar or object of interest on which another avatar has locked its gaze, using LookAt. |
| Moodicon | A symbolic graphical object that is emitted from an avatar's head. |
| Objective Gaze | Gaze behaviors that appear the same to all users (though they may be delayed in time by different amounts so the combination of behaviors may look somewhat different). |
| Pilot avatar | A given user's avatar. |
| Shadow avatar | An avatar controlled by someone other than the user. |

-continued

| | |
|---|---|
| Smiley | A word in the Smiley language and its associated emotion. |
| Subjective Gaze | Gaze behaviors that are not (necessarily) shared among users, i.e., may not appear the same to all users. The purpose of these is typically to enhance the subjective social experience of the user. |
| Targeted emotion | An emotion that only applies when the pilot avatar has a LookAt target. |
| Toggle emotion | An emotion that continues until turned off, e.g. 'handup in the stage continues until 'handdown. |
| Two-person moodicon | A moodicon that moves from the pilot avatar to a shadow avatar. |
| User | A human being who operates a machine in which techniques described below are implemented. |

III. Overview of Described Solutions

Described below are various avatar-related techniques, organized for purposes of description into the following three topic areas:

A. Cinematics, Chat Props and Chat Balloons in Avatar-Centric Communication

B. Avatar-Centric Expressive Communication

C. Avatar Sentient Gaze

IV. Cinematics, Chat Props and Chat Balloons in Avatar-Centric Communication In previous 3D (virtual) worlds, conversation has been presented in a way that is no different from online text conversations without a 3D world, using instant messaging and email. The presence of avatars has essentially been ignored in the design of communication. Displaying chat text in a 2D window separates it from the 3D world, and thus it cannot be used as an "extension of body language". The techniques introduced herein address these issues by coordinating various communicative elements in-world, within a comprehensive structural system called Chat Props, which are discussed in greater detail below.

The techniques introduced herein embed textual conversation into the 3D space of the avatars, and use cinematic virtual cameras to facilitate conversation and add drama to these conversations. These techniques include the following features:

Chat Balloons—Includes controlling Chat Balloon placement, movement, appearance, and font, for facilitating group conversation.

Chat Props—Includes: 1) the use of furniture (such as benches and card tables) to position avatars and provide a set of cameras that the user can easily select; and 2) a facility (without furniture) for placing avatars in specific locations around a conversation area, as participants arrive spontaneously (Auto-Chat Props).

Cinematics—The use of virtual "cameras" in cinematic ways to facilitate communication and increase the emotional impact of avatar conversations.

A. Chat Balloons

Figure 4:
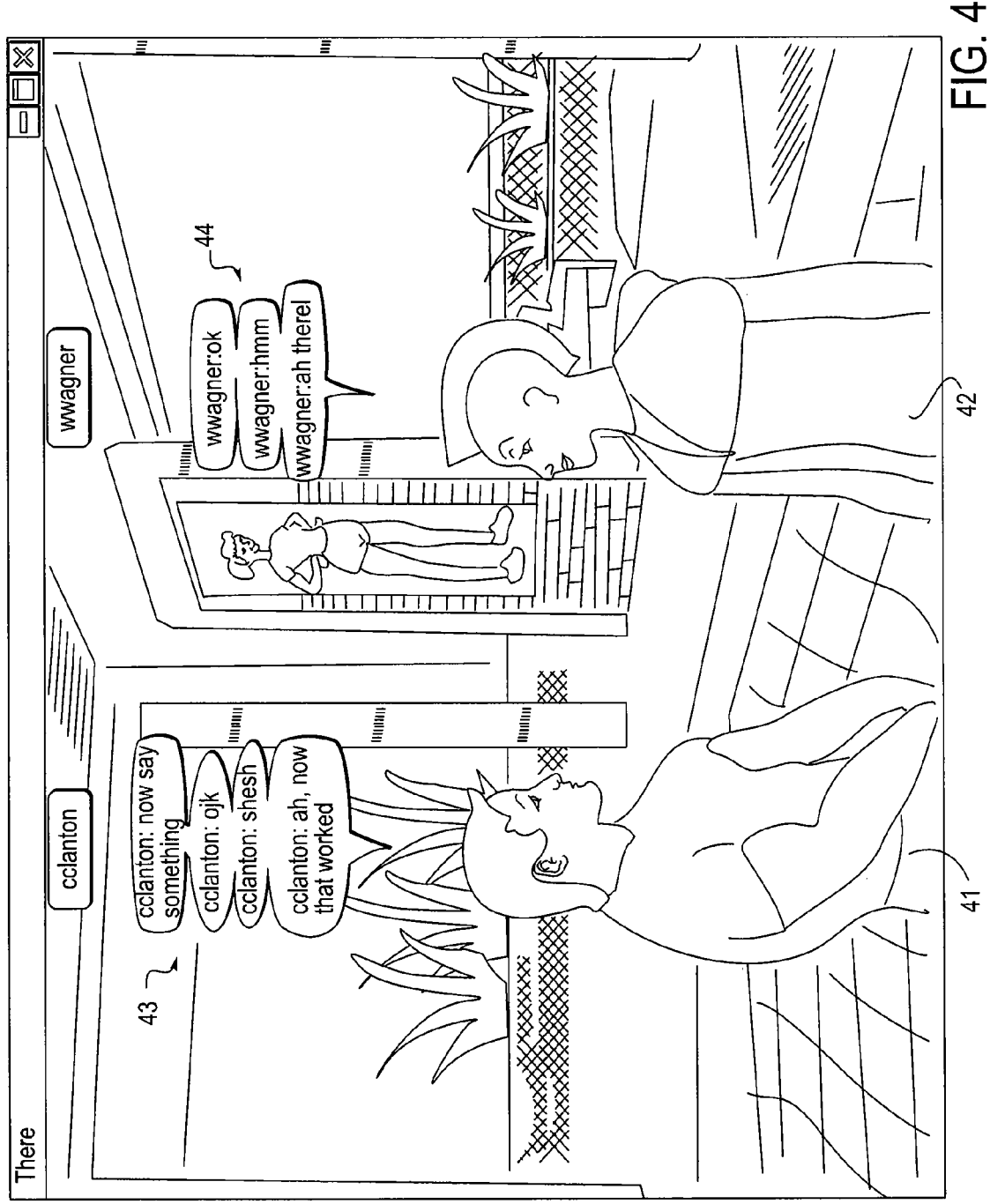
FIG. 4 shows an example of a computer screen display showing two avatars engaged in a conversation in a 3D virtual world during a simulation, where Chat Balloons are used to represent the avatars' speech.

In comic books and advertisements, bubble-like shapes called "balloons" are used to contain text representing speech of an illustrated character. These balloons typically have a "tail" pointing to the speaker. In the context of the present invention, these balloons are referred to as "Chat Balloons". In a virtual world, Chat Balloons must be designed to make it clear who is speaking, and what he or she is saying. In addition to designing for these needs, the techniques described herein provide additional visual information, as described below. FIG. 4 shows an example of a computer screen display showing two avatars engaged in a conversation in a 3D virtual world during a simulation, where Chat Balloons are used to represent the avatars' (user-specified) speech.

Chat Balloon Priority

While viewing a group of avatars in the distance, it is useful to be able to tell if that group is engaged in conversation. However, since they are in the distance, it is usually less important to be able to read what is being said or to know which avatar in a group is saying it. But for speaking avatars close to the user's avatar (the pilot avatar), it is important to know who said what, and in what chronological order. Some speakers may be so important that their chat should stand out above everyone else's, e.g. a lecturer on a stage. To solve this problem, a system of Chat Balloon priorities can be used. In certain embodiments of the invention, there are four levels of priority, having the following characteristics:

1) No priority

At this priority level, Chat Balloons are not visible. This keeps irrelevant chatting from interrupting a specific high-priority conversation or social event. For instance, this priority can be used for a stage, to keep inter-stage conversations as clear as possible, without the background interference of Chat Balloons from avatars standing outside of the stage.

2) Low priority

Chat Balloons of distant avatars are generally assigned low priority and are visible if the avatars are visible. Chat Balloons of low priority are displayed in 3D, i.e., they obey laws of perspective in the sense that they appear smaller as their distance to the camera increases, while Chat Balloons of nearby avatars are larger and more legible. Low priority (3D) Chat Balloons are displayed as 'billboards'—flat objects positioned in 3D space and oriented so that they always face the camera. More distant Chat Balloons are more translucent than nearby Chat Balloons, and distant Chat Balloons may overlap one another while nearby larger Chat Balloons avoid overlapping from the camera's (user's) viewpoint. So, distance Chat Balloons are small, translucent, and may overlap; their purpose is to show a conversation happening, not to make it legible. This approach saves screen space for nearby Chat Balloons which are larger, more opaque, and non-overlapping so that they are easier to read.

3) High priority

Nearby avatars that are part of a "Chat Group" (described below) are assigned high-priority. This Chat Group includes the user's avatar, all avatars within a certain distance, and all avatars in a Chat Group with any avatar with whom the user's avatar is in a Chat Group. This means that avatars can be some distance away but ensures that the user can share the same conversational context with all his chatmates. Chat Balloons of high priority are not displayed in 3D but are instead displayed on the 2D screen, overlaid on the 3D scene. They are rendered so as to ensure they are legible, since avatars in a Chat Prop together share a single conversation. Chat Balloons of high priority are arranged in vertical columns on the screen and are opaque. More specifically, the screen is divided into a predetermined number of (e.g., seven) columns for placement of Chat Balloons, so up to that number of avatars can chat with high-priority balloons at the same time. Each column contains the Chat Balloons of a different avatar. The columns are allocated to the most recent speakers, such that an avatar who remains silent for some time may lose its balloon column to an avatar who has just recently started speaking. The transition from low priority to high priority based on distance is tuned so that the transition is subtle and non-distracting. Low priority Chat Balloons are not allowed to occlude high priority balloons.

4) Super-high priority

Special avatars can have Chat Balloons of super-high priority, which are always on-screen and impervious to any other competition for attention by other Chat Balloons. For example, these Chat Balloons may have an opaque white background, a strong border, and black text to ensure that the "speech" it contains is always legible. For example, a Presenter (e.g., a master of ceremonies) on a stage Chat Prop may have super-high priority Chat Balloons. These balloons are always on the screen of every member of the Chat Prop whether or not the avatar of the Presenter is visible. Super-high priority Chat Balloons are not allowed to be occluded by other balloons or objects in the world.

Figure 5A:
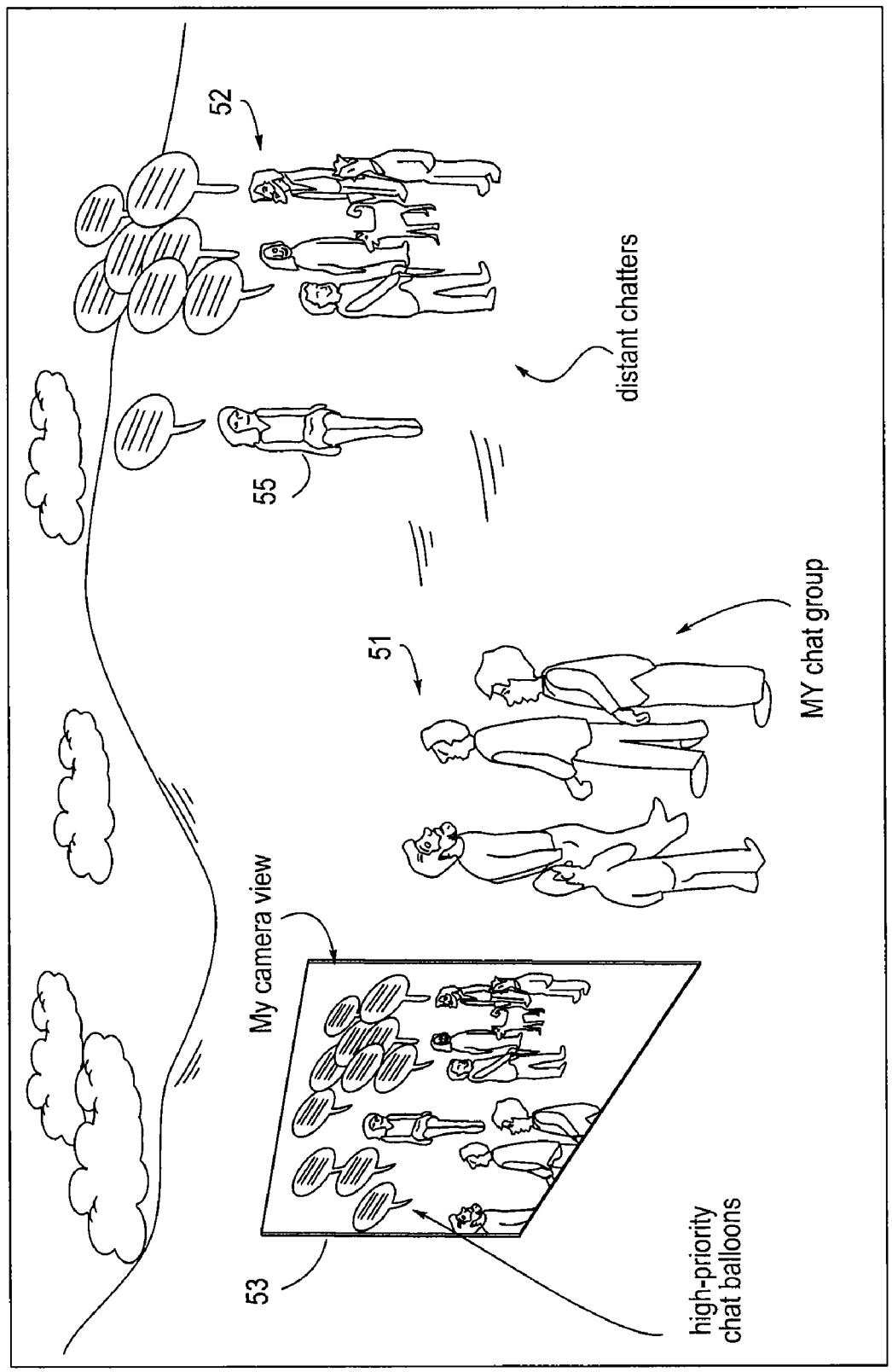
FIGS. 5A through 5C illustrate the use of Chat Balloon priority.
Figure 5B:
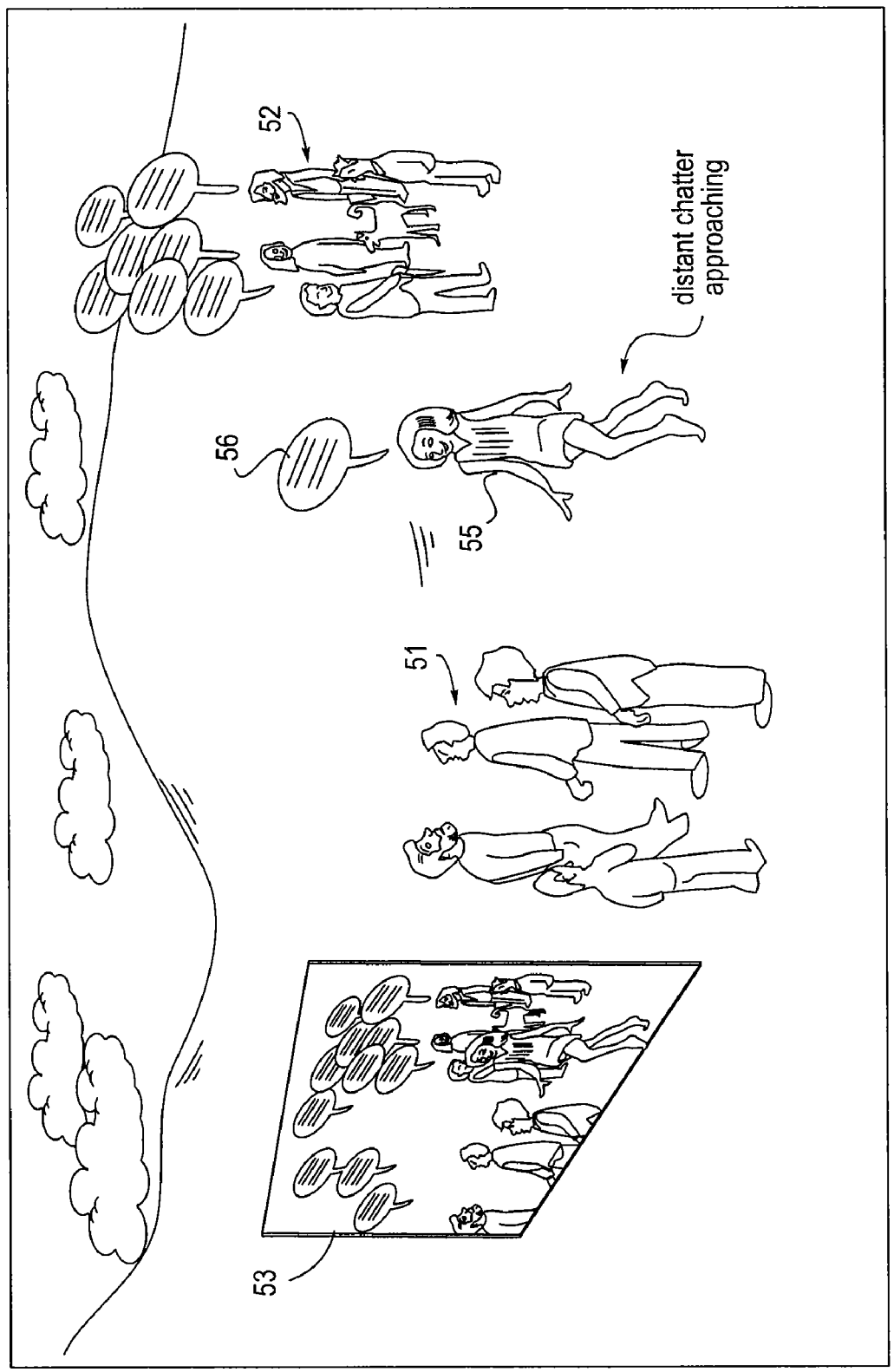
Figure 5C:
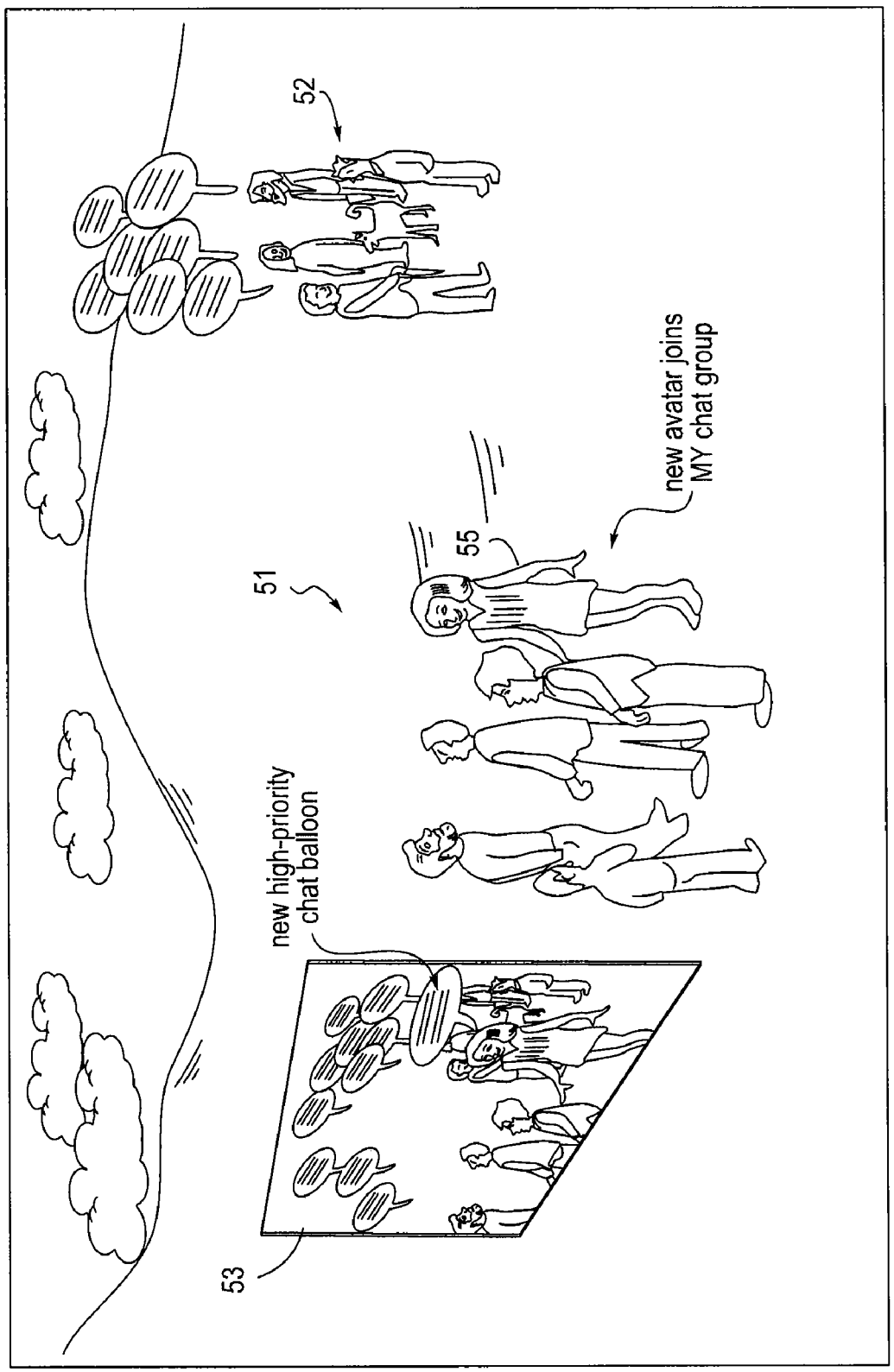

FIGS. 5A through 5C illustrate the use of Chat Balloon priority. In this scene, avatars have gathered into two Chat Groups, one Chat Group 51 in the foreground and another Chat Group 52 in the background. The user's avatar is in the foreground Chat Group 51, and the user's view of the world is illustrated schematically by the translucent screen 53 on the left. Both Chat Groups are within the camera's view and so they show up on the screen 53, along with their Chat Balloons. The user's Chat Group 51 has high-priority balloons, while the Chat Balloons of the background Chat Group 52 are low-priority. There are many factors that can be used to determine Chat Balloon priority, but this illustration only shows Chat Balloon priority as a result of the speaker being in or out of the user's chat group.

In-World vs. On-Screen

One way to think of Chat Balloon priority is to consider low-priority balloons as "in-world" and high-priority (and super-high priority) balloons as "on-screen". Low priority Chat Balloons are positioned in the 3D world above their speakers' heads. They are rendered as flat billboards (always facing the camera) causing them to appear 2D, yet still positioned in appropriate locations in the world. Low-priority balloons are translucent and may overlap with each other. They behave roughly like (flat) helium balloons floating above their speakers' heads. Low-priority Chat Balloons may be illegible, because they may be occluded by other balloons or other objects, or they may simply be too far away.

High-priority balloons appear similar to low-priority balloons, except they are always clearly visible and legible. To enable legibility, they have the following attributes:

They are opaque

They do not overlap

They are arranged from left to right according to the left-to-right arrangement of the corresponding avatars' heads They are arranged vertically roughly according to chronology within the conversation They are shown "in front of" everything else in the world—nothing can overlap them Transitioning Priority In FIG. 5B, one of the distant avatars 55 approaches the user's Chat Group. Her Chat Balloon 56 floats above her head as she walks. In FIG. 5C, she joins the user's Chat Group 51. After this point, her Chat Balloons are rendered as high priority balloons. The switch from low to high priority appears fairly smooth from the camera's point of view, even though the geometry is mapped from the 3D world to the 2D screen, along with the shifting required to arrange the other high priority Chat Balloons. The differences between low priority Chat Balloons and high priority Chat Balloons can be further seen from FIG. 6.

Providing a smooth visual transition from high to low priority can be accomplished, in part, by mapping the four 2D screen coordinates of the corners of the high (2D) priority balloon to 3D positions in the world, approximately over the head of the associated avatar, such that the visual result to the user at the time of the transition is minimal or non-existent. In addition, while in the low priority (3D) state, the actual 3D size of a Chat Balloon can change as a function of a change in its distance to the camera. It increases in size as a function of distance while less than a predetermined critical distance to the camera, so as to make its apparent size either the same to the user as if it were a high-priority balloon, or to appear to shrink by some predetermined amount. When the distance from the low priority Chat Balloon to the camera is larger than this critical distance, the Chat Balloon's actual size (as opposed to apparent size) remains constant, such that the Chat Balloon behaves like a normal 3D object displayed using 3D perspective geometry and appears to recede as a function of distance in a natural way.

Chat Columns—Vertical Registration of Group Chat Balloons

Figure 6:
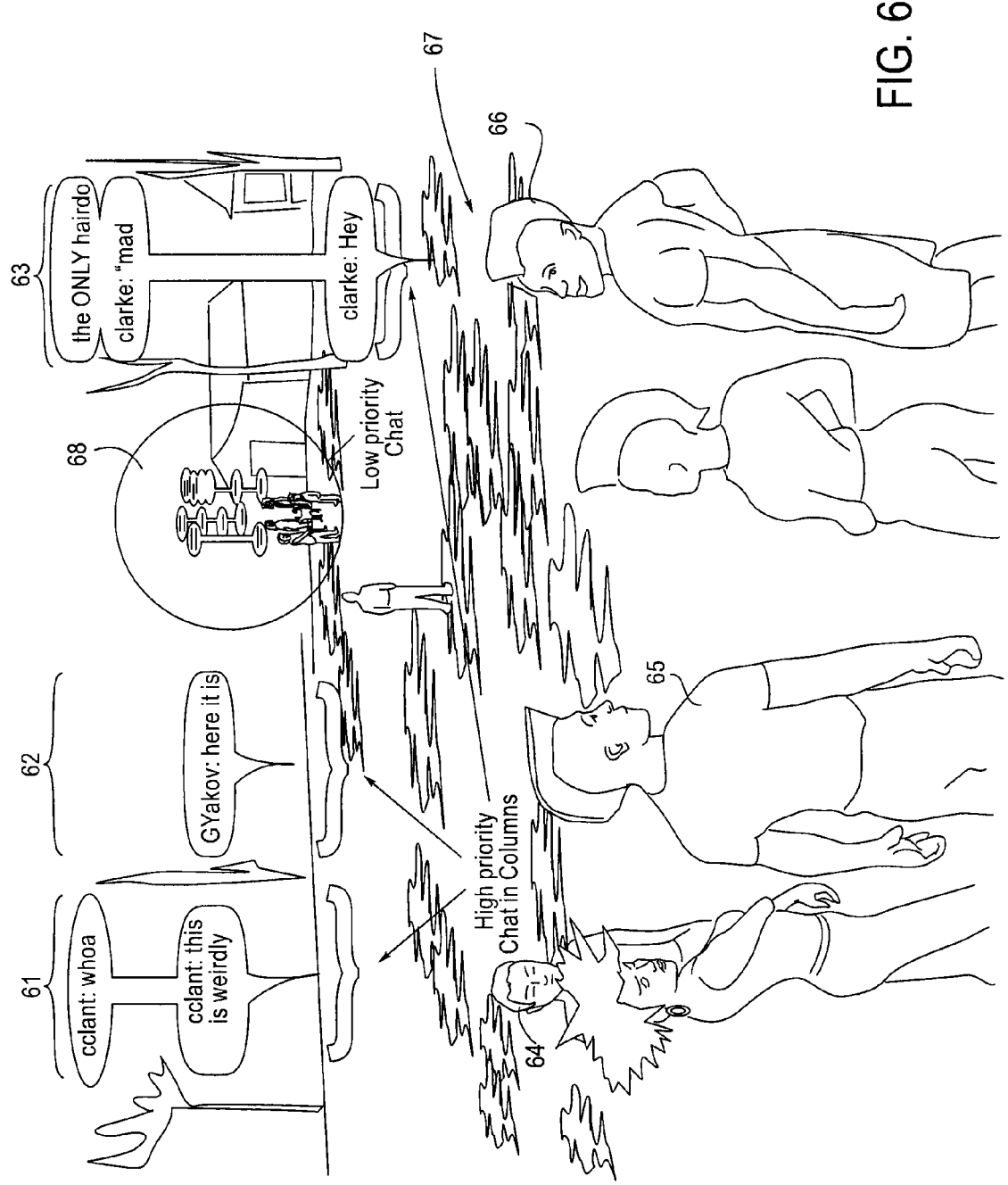
FIG. 6 shows the use of chat columns for Chat Balloons.

In the above-described priority system, each user whose avatar is in a Chat Prop (described further below) actively converses with users controlling nearby avatars which have high priority Chat Balloons, all of which are arranged in chat columns. The left-to-right arrangement of the chat columns matches the left-to-right arrangement of the avatars on the screen. This approach is shown in FIG. 6. The Chat Balloons of avatars 64, 65 and 66 in the user's Chat Group 67 are high priority and, therefore, are placed in chat columns 61, 62 and 63, respectively. In contrast, the low priority Chat Balloons 68 of the distant Chat Group (the Chat Group to which the user does not belong) are not arranged into chat columns in this manner.

Because there may be more avatars than available chat columns, and because columns may not always appear directly over their associated avatars, a number of techniques can be used to clearly identify the correspondence between an avatar and its associated Chat Balloons, such as the following (note that not all of these techniques need be implemented in any given embodiment of the invention):

Chat Balloons are created when a user begins typing text; they first appear immediately over the speaking avatar, quickly increase to full size, and float upward towards the appropriate chat column and height.

Whenever the left-to-right arrangement of avatars on screen changes, the Chat Balloon left-to-right arrangement shifts accordingly, with ease-in, ease-out motions. The balloons also ignore rapid shifts in arrangement caused by small motions, such as when two avatars are nearly occluding each other. Left-to-right arrangement can also be affected by the user changing cameras or avatars moving around. For quick camera cuts to facial expressions, temporary balloon adjustments would be disruptive. So temporary cut-away cameras freeze the Chat Balloon column assignments. When avatars move around, the columns change, but this change occurs with some hesitation to avoid bouncing back and fourth when two avatars are nearly in each others way.

Chat Balloons fill up with words much like a balloon being blown up with helium, as words are added. When the amount of text reaches a critical maximum, the Chat Balloon is "released", and a new Chat Balloon is created to accept the continuing flow of new words. Multiple Chat Balloons accumulate in a vertical stack as a result.

These vertically-stacked Chat Balloons avoid collisions with each other. Consecutive balloons are connected by an umbilical cord-like connector, much like what is used in comic books. There is a limit to the number of vertically-stacked Chat Balloons, thus, the highest (oldest) Chat Balloon will rise and disappear off the top of the screen when a fresh balloon is created, thus keeping the number within the limit.

The lowest (newest) Chat Balloon has a tail, which points towards the source of the chat (the avatar's head position).

When a user completes the typing of a word, a small dash, or "bullet" flies from the source avatar, through the tail, and to the base of the Chat Balloon. These bullets visually represent "speech" from the avatar's mouth to the balloon, and provide a subtle visual dynamic that helps to visualize group conversation rate, speech overlap, etc.

Quiet and subtle sound effects occur at key Chat Balloon events, to accompany visual effects, to help users sense conversational dynamics, often on an unconscious level. These sound effects (and their associated events) may signal:

Initial creation of a Chat Balloon

Completion of words, accompanied by bullets

Erasing or backspacing letters of a word

"releasing" a Chat Balloon—e.g., caused by the user hitting the return key time-out release of upper-most balloon, as a result of reaching maximum lifespan Chat Balloon Customization and Individuality A user can change certain visual characteristics of his Chat Balloons to personalize them, using a graphical user interface on the client. This customization also adds variety which makes it easier to identify the balloons of a specific avatar. The Chat Balloon features that a user can customize may include, for example: border color, text font, text color, background color, and choices of sound effects.

Water Wheel Metaphor

Figure 7B:
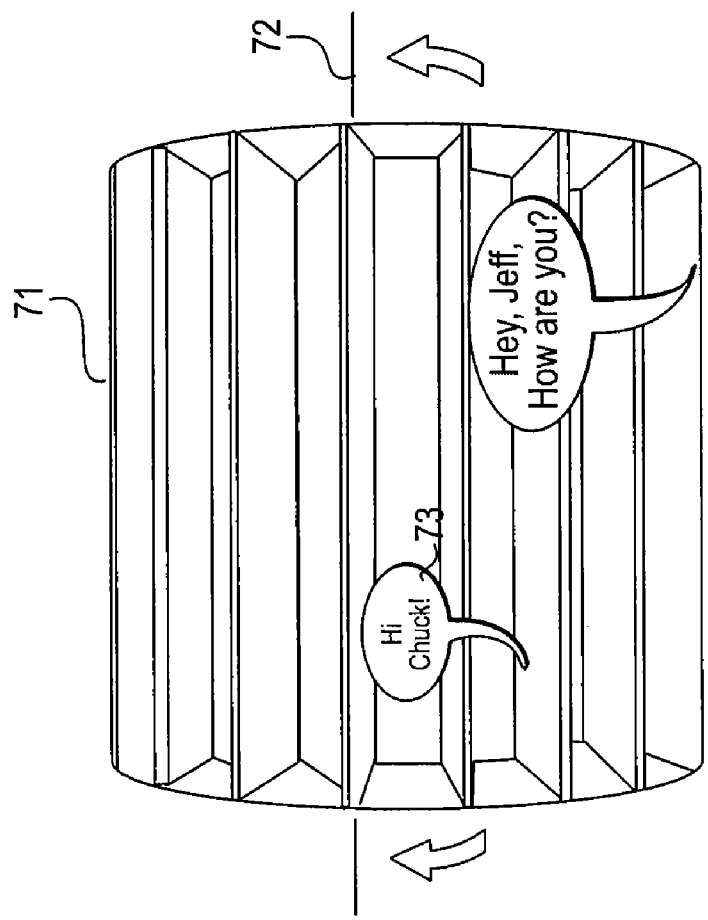
FIGS. 7A and 7B illustrate the water wheel metaphor for displaying Chat Balloons.
Figure 7A:
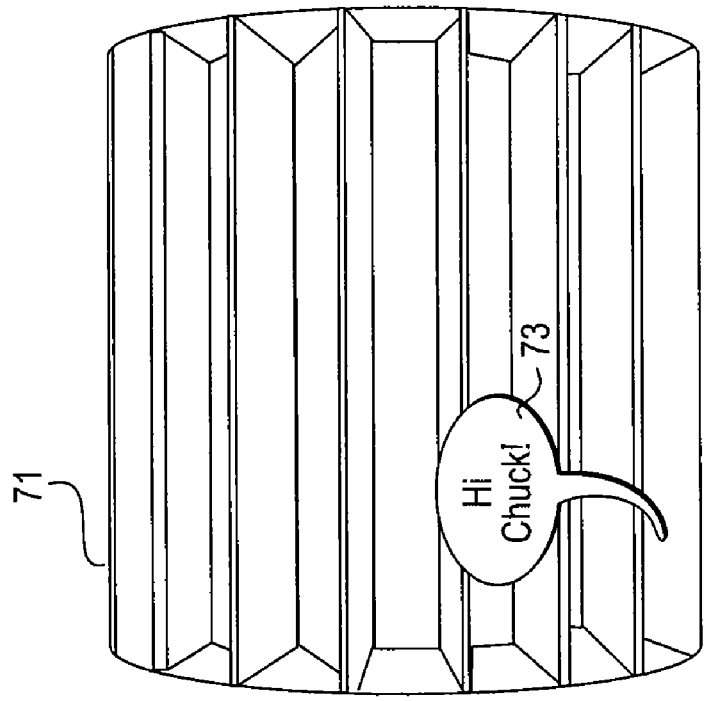

If Chat Balloons were to disappear too soon after creation, users might miss something. If the order of Chat Balloons is not visualized as they rise, then it becomes difficult to follow the chronology of the conversation. To address these two problems, the concept of a "water wheel" is used, as illustrated in FIGS. 7A and 7B. The waterwheel metaphor is a way to explain the behavior of balloons as they assume their positions within the vertical columns and as they stack vertically over avatar heads. FIG. 7B illustrates the water wheel 71 at a point in time just after that of FIG. 7A. The water wheel 71 rotates about an imaginary axis 72, as if due to water flowing over it. However, since Chat Balloons can be thought of as being filled with imaginary helium, the water wheel moves upward, rather than downward. As a user fills up balloons causing them to be released automatically, or hits the return key to release the balloon, the Chat Balloon 73 moves up and joins the waterwheel. With every Chat Balloon release within the Chat Group, the water wheel rises one notch, maintaining its chronological order with balloons from other speakers. The goal of the waterwheel is to keep Chat Balloons on the screen as long as possible to be read while ensuring that older Chat Balloons are always higher than younger balloons. So, Chat Balloons do not rise according to some simulated physics (like a helium balloon), but rather, according to a mechanism that slows their ascent while maintaining order.

Interleaving Expressions with Words

Users must be able to follow a conversation and understand the relationship of avatar expressions in connection to their words. This is one of the purposes fulfilled by word-at-a-time" Chat Balloon text entry. In certain embodiments of the invention, users can type words, mixed with triggering avatar expressions, for a dynamic mix of verbal and nonverbal communication.

Figure 8A:
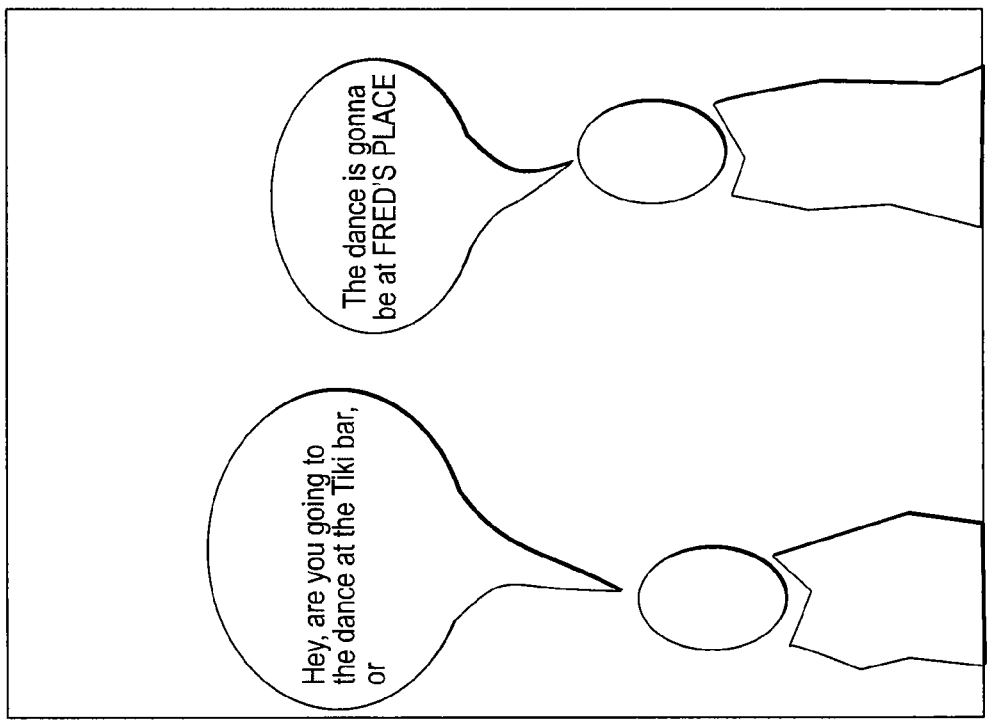
FIGS. 8A and 8B illustrate the word-at-a-time chat feature.
Figure 8B:
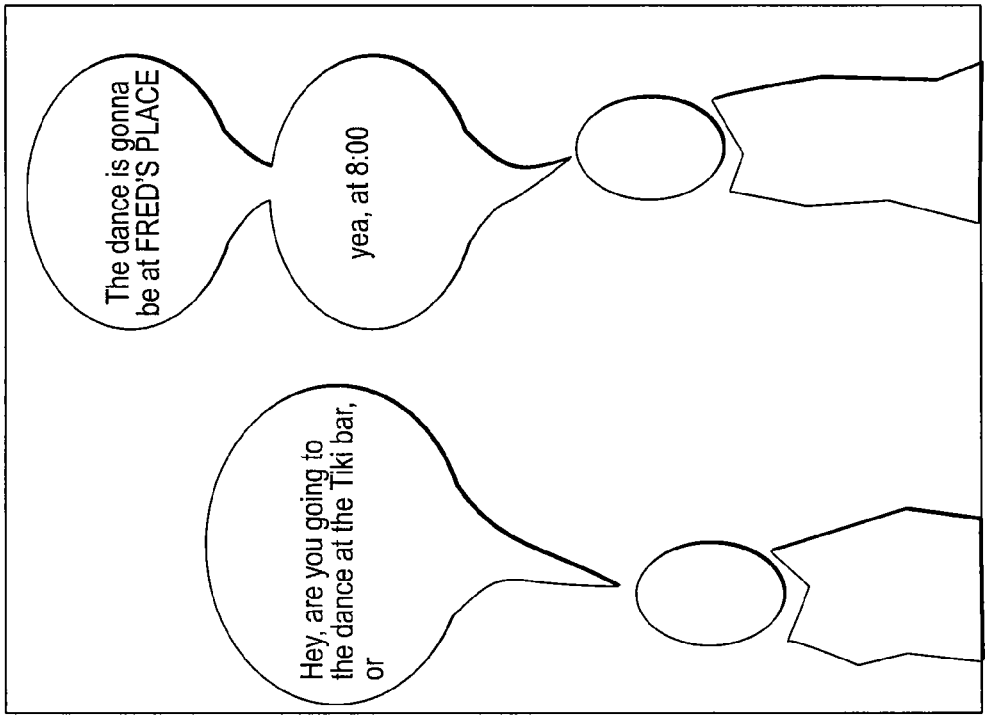

To properly interleave emotional expression and chat, in the system of the present invention, chat is normally transmitted across the network in units of what is commonly considered the primary unit of meaning in language: the word. Thus, words that trigger expressive "body language" appear in their correct place in the sentence with the other words of the conversation. The word-at-a-time feature also allows conversations to occur in a more parallel fashion, much as they tend to do in person. Space or punctuation ends a word, sending it to the Chat Balloon. FIGS. 8A and 8B illustrate the word-at-a-time chat feature, and more specifically, two avatars speaking at the same time and responding to each other as the speech occurs.

Hitting the return key releases the currently-forming Chat Balloon. New users may not know the conventions used for avatar chat, so they may not hit return to free the balloon or a space or punctuation after a word to send it. To fulfill their intent, both balloons and words can be sent automatically after a specified delay. In certain embodiments, pressing return also pushes balloons up so that it is possible for a user to get rid of a balloon containing something previously said, to avoid confusion if someone new approaches and a new conversation is starting.

Chat Balloons provide a shared conversational experience. Since all Chat Balloon behavior is distributed, Chat Balloons appear the same to all users in a shared conversation. Because of this, each user can determine whether he needs to slow down to give others a chance to read what they have written. Social conventions are allowed to emerge among chatters, because they share the same visual information.

Figure 9:
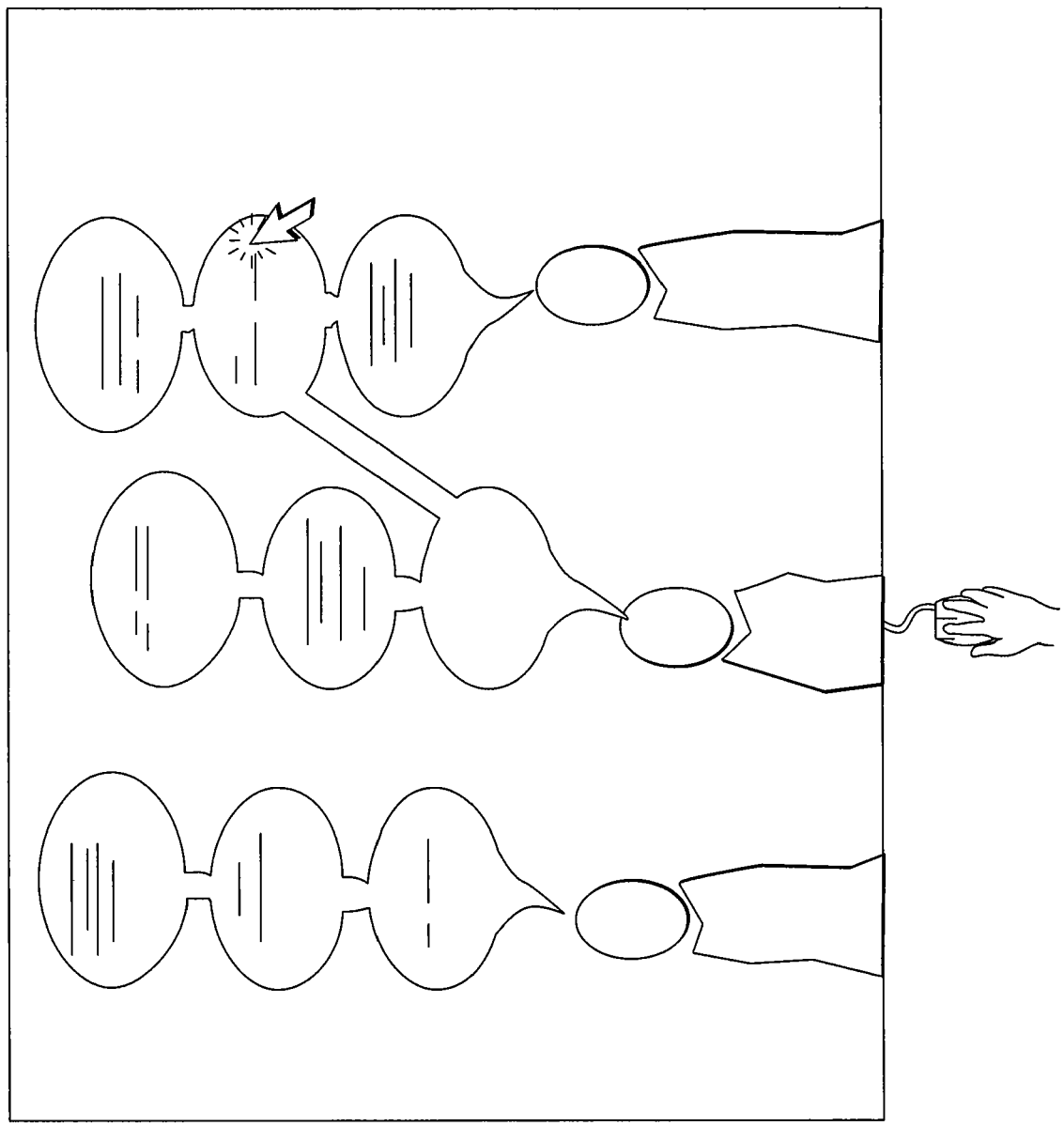
FIG. 9 shows visual connector between two Chat Balloons to identify a reply.

To help clarify meaning and reference previously entered text, users can click on another avatar's Chat Balloon to create a reply to that particular balloon. This creates a visual connector between the two balloons, as shown in FIG. 9.

B. Chat Props

Figure 10:
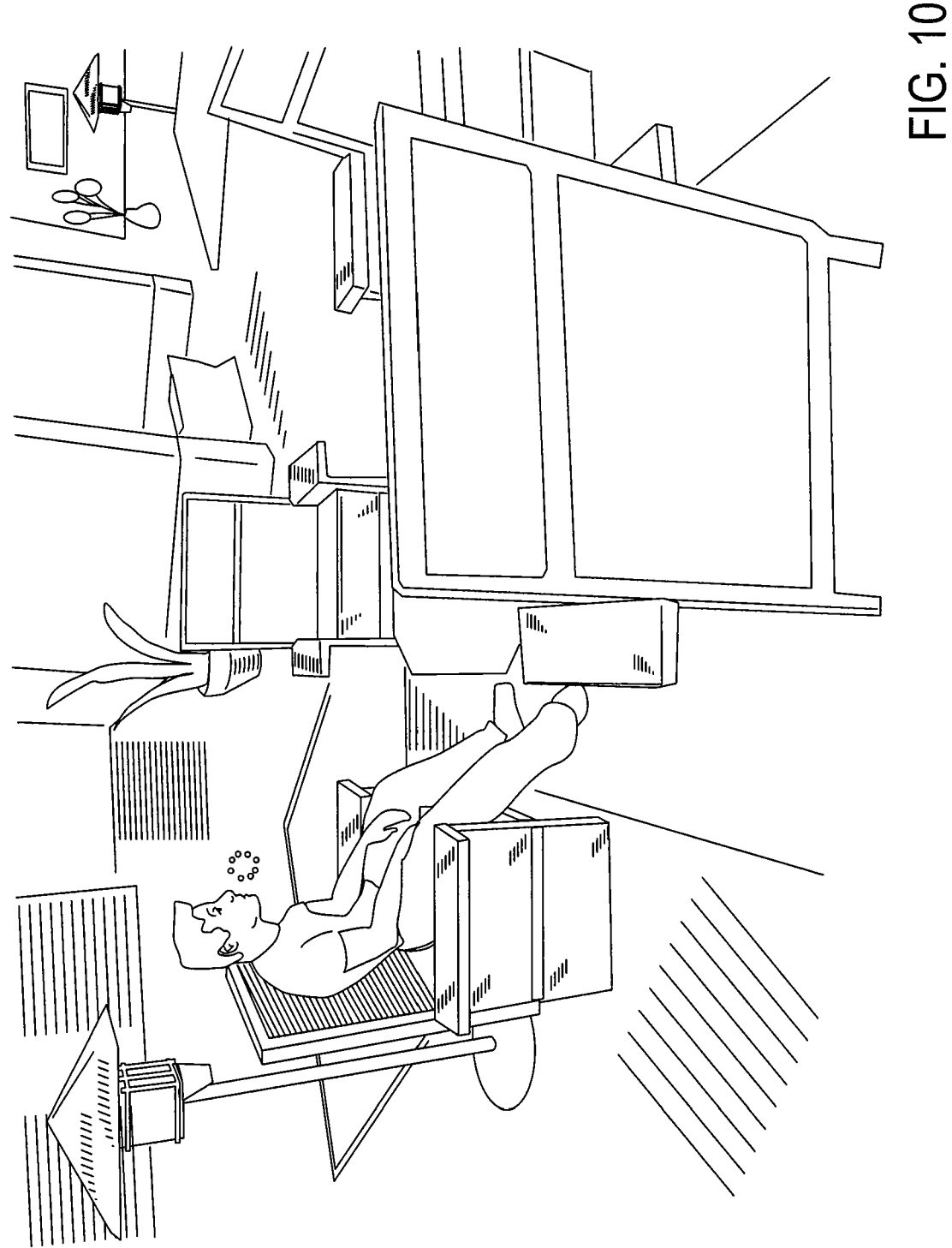
FIG. 10 shows an example of a Chat Prop.

In the real world, conversations normally have a context or subject. Conversations also often have "flavors" and meaning. Talking on a ridge overlooking the Grand Canyon feels very different from talking in an intimate coffee house; a dance club or bar feels different yet again. A virtual world may contain all of these situations and contexts. Consequently, introduced herein is a special type of virtual furniture, called Chat Props, for avatars to sit on to talk in these contexts. A Chat Prop is a prop that defines the context for a an avatar conversation. An example of a Chat Prop is shown in FIG. 10, which shows a living room Chat Prop.

The primary purpose of Chat Props is to position avatars so that it is possible to establish effective camera views and to provide convenient relative positioning of avatars for viewing expressions. Because Chat Props ensure that avatars are in known locations, cameras can be pre-positioned within the Chat Prop in such a way as to frame the conversation and heighten drama. Then a user can cycle through the pre-positioned camera positions quickly rather than having to take the time to position the camera manually.

Examples of Chat Props are: a single chair; a bench with two seats; two chairs facing one another; a bench facing two chairs; or a stage with standing slots for a Master of Ceremonies, a guest, and 12 audience seats divided by an aisle into two teams. Any grouping of furniture and its environment can be built as a Chat Prop so as to group avatars into a single conversational unit. Thus, all of the avatars in a Chat Prop see each other's balloons as high priority by default (although this can change under certain conditions as described below).

Avatar Slots

A Chat Prop has a fixed number of slots in known locations. A slot is typically a seat, such as one of the two seat areas on a small sofa or bench. However, a slot can also be a location to stand, or even a location floating in the air on a beam of light—it all depends on context of the Chat Prop. Each slot can be occupied by only one avatar. When an avatar approaches a Chat Prop, its user can choose to join the Chat Prop at any available slot.

Operation of Avatar Slots

Figure 11:
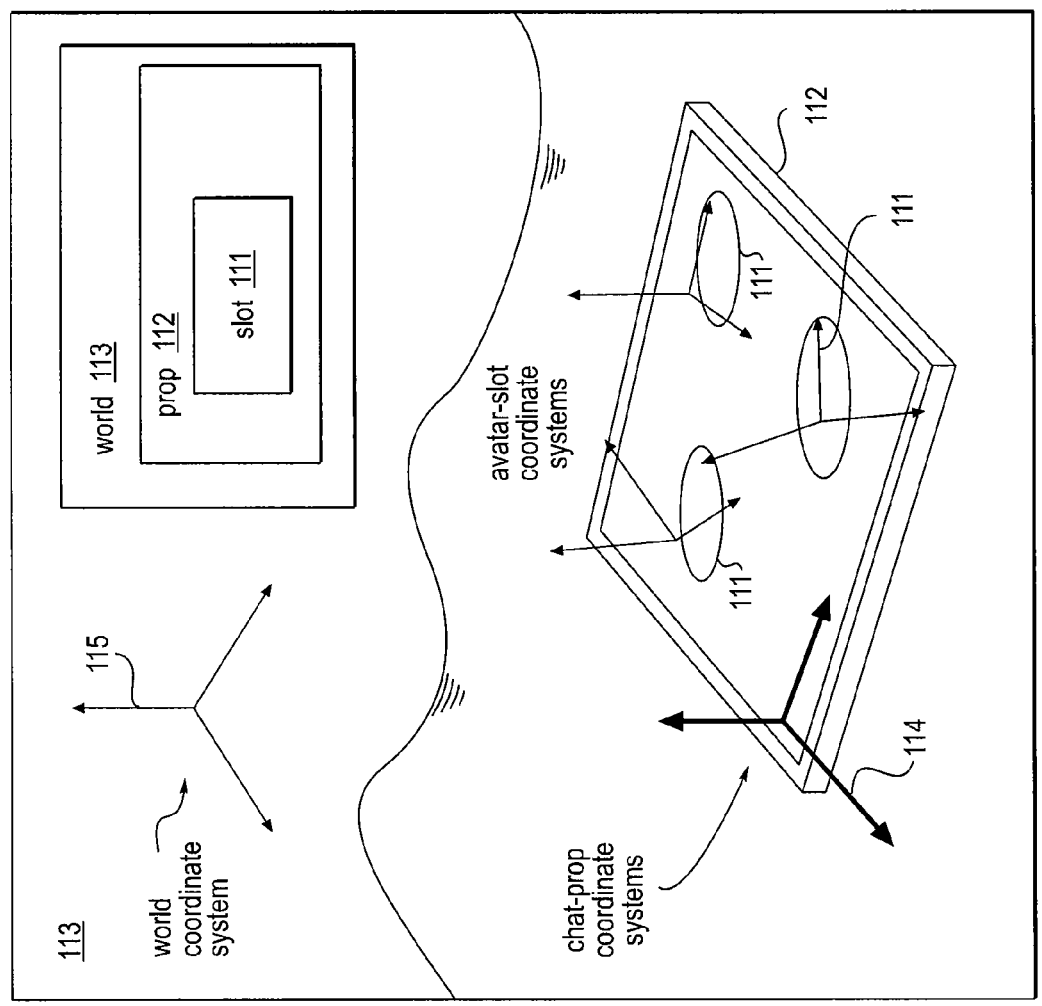
FIG. 11 schematically illustrates the relationship between slots, Chat Props, and the virtual world.

Referring now to FIG. 11, avatar slots are now further explained with reference to a schematically-illustrated sample Chat Prop 112. The avatar slots 111 are pre-defined positions in the Chat Prop 112 with headings relative to the Chat Prop 112 itself. An avatar slot 111 can be thought of as a local frame of reference (coordinate system) containing a position and an orientation. The Chat Prop 112 also has a frame of reference (position and orientation) 114 within the simulated "world" 113, and all of the slots 111 in the Chat Prop 112 are defined relative to the frame of reference of the Chat Prop. Further, the simulated "world" 113 has its own frame of reference 115.

So, for instance, a Chat Prop in the form of a card table might be designed to have four seats surrounding the table in positions corresponding to four chairs and headings corresponding to the facing of the chairs inward. When the pilot avatar approaches the Chat Prop, the user can choose to join the Chat Prop. That choice could be either general (i.e., join the nearest available seat) or specific to a slot (e.g., clicking on the seat to join, clicking on a pop-up menu over the seat, etc). On joining, a brief animation is played of the avatar sitting down, and a variety of events can happen, such as camera changes, gaze changes as avatars acknowledge the newcomer, and other things, depending on the nature of the Chat Prop.

Designing Chat Props

Chat Props can be designed using a variety of software and modeling tools, such as: C++ for the lower-level engine; a 3D modeling and animation package for designing Chat Prop visuals, camera placements, and avatar animations (e.g., 3D Studio Max); and a scripting environment for higher-level architecture, Chat Prop specification, and event-triggered behavior. The combination of these design tools (especially the scripting level) empowers designers and programmers to build a large variety of Chat Props and invent many variations.

Specification of Chat Balloon Priority in a Chat Prop

Figure 12B:
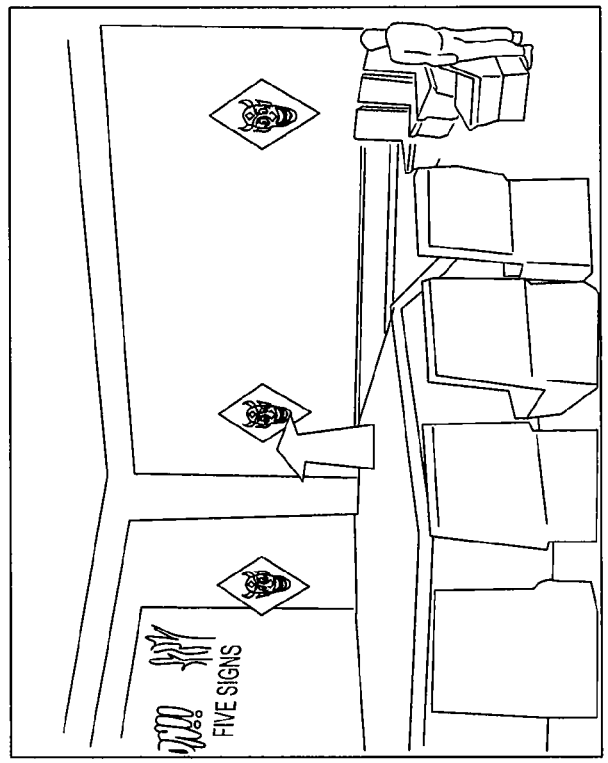
FIGS. 12A and 12B show a Stage chat prop.
Figure 12A:
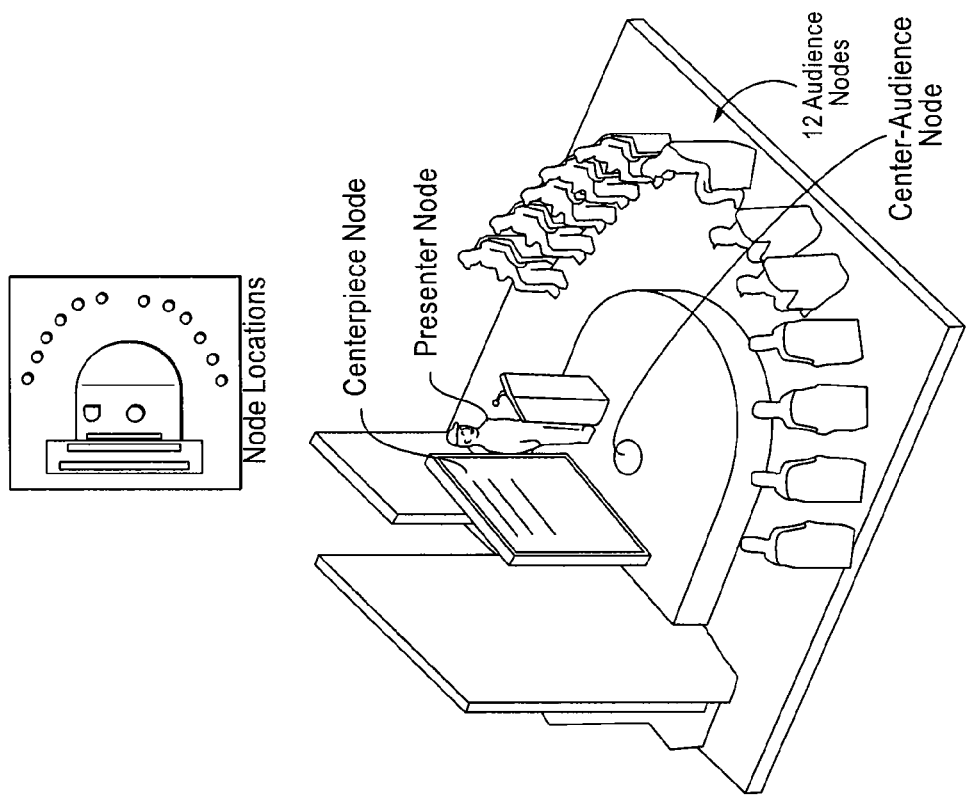

Generally, when in a Chat Prop, the Chat Balloons of all the other avatars in the Chat Prop and any avatars standing close enough to share a Chat Group are high-priority. But, by using a general scripting environment one could design specialized Chat Props with alternative priority schemes for the Chat Balloons of other avatars. These priorities can be set for avatars in the other slots as well as avatars within specific regions within some distance of the Chat Prop. The regions may be enclosed in spheres defined with a center and a radius. There can be up to a predetermined number of regions, which are ordered in priority. The regions can be reset at any time, such as when a camera changes (see section on Cinematics). The following are examples of using prioritization in this manner:

- A Stage Chat Prop is illustrated in FIGS. 12A and 12B. The Stage Chat Prop has an audience consisting of two teams of six chairs each. The teams can have discussions where only Chat Balloons of teammates are visible.
- At other times, when the stage is being used for a fashion show, the region of the stage can be set to high priority for the avatars in the stage Chat Prop, so the Chat Balloons of any avatar on the stage are more legible, even though those avatars have not joined the Chat Prop. Similarly, the Chat Balloons of avatars behind the stage can be made invisible to the avatars in the stage Chat Prop.
- The Chat Balloons of the avatar in the Presenter (the presenter) slot on the stage can be set to the highest priority so that they are always visible, with an opaque white background easily distinguished from other Chat Balloons.

Chat Props in Motion

The Chat Props described above are static furniture elements positioned in a predetermined configuration. But Chat Props can also be animated or mobile in a number of ways, as illustrated in the following examples:

1. "Swing Set" paradigm: animated Chat Prop, stationary camera)

The swing set Chat Prop simulates a swing set commonly found in a children's playground. In this type of Chat Prop, Chat Balloon column assignment stays fixed (to avoid confusing motion from swinging avatar positions). The assignment of Chat Balloons to columns does not immediately change, so Chat Balloon position on screen remains stable even though the relationship of the two avatars on screen may be briefly ambiguous or reversed.

2. "Dune Buggy" paradigm: moving Chat Prop, moving camera, third-person vehicle camera The Chat Balloons of the passenger and driver of a two-seat motor vehicle, such as a convertible dune buggy, remain positioned over the avatars, in a generally fixed relationship with the vehicle, so that they are always legible. For user input purposes, "cruise control" can be enabled in the vehicle to make it easier for the driver to talk while in a moving vehicle.

3. "Hay Ride" paradigm: moving Chat Prop, moving camera

A hay ride Chat Prop simulates avatars riding in the back of a horse-drawn hay wagon, or the like. In this Chat Prop, the camera faces mostly inward at the avatars in the Chat Prop, but the world appears to move by in the background. Chat Balloons rise in columns based on the avatar positions in the Chat Prop, just as if it were stationary.

4. "Tour Bus" paradigm: moving Chat Prop, moving camera

In this type of Chat Prop, the camera is mostly outward facing, looking at the world around the vehicle, but fixed to a position inside the vehicle. Chat Balloons rise in columns based on the avatar positions in the Chat Prop, just as if it were stationary.

Implementation of Moving Chat Props

Moving Chat Props can be implemented in essentially the same way as stationary Chat Props, with a few important differences:

- All Chat Props have an explicit World Position and World Heading (horizontal direction), and avatar slot positions and headings which are stationary relative to the Chat Prop position and heading. In the case of moving Chat Props, these data can be dynamic. Thus, an avatar slot can move within its Chat Prop relative to the Chat Prop's frame of reference (as in the case of the swing set example), or the frame of reference of the Chat Prop itself can move through the virtual world (as in the case of the vehicle example), or both.
- Chat Prop camera positions and orientations can be dynamic in response to the motion of the Chat Prop.
- The motions of avatar slots relative to the virtual world should not be too fast for users to approach them by walking their avatars up to them and joining them.
- The world trajectories of moving Chat Props can be deterministic and repetitive (such as a tour train with scheduled stops along its route), or they can be pseudo-random (such as in a two-person elephant ride, in which the elephant has free will to walk where ever it wants).

Auto-Chat Props

While Chat Props provide rich conversational context, users sometimes want the freedom to converse anywhere in the virtual world, and they do not always want to have to find a Chat Prop to do this. However, it is still desirable that such conversations have cinematic cameras and legible Chat Balloons. This problem can be solved with two levels of conversation: Auto-Chat Props and Chatgroups.

Figure 13B:
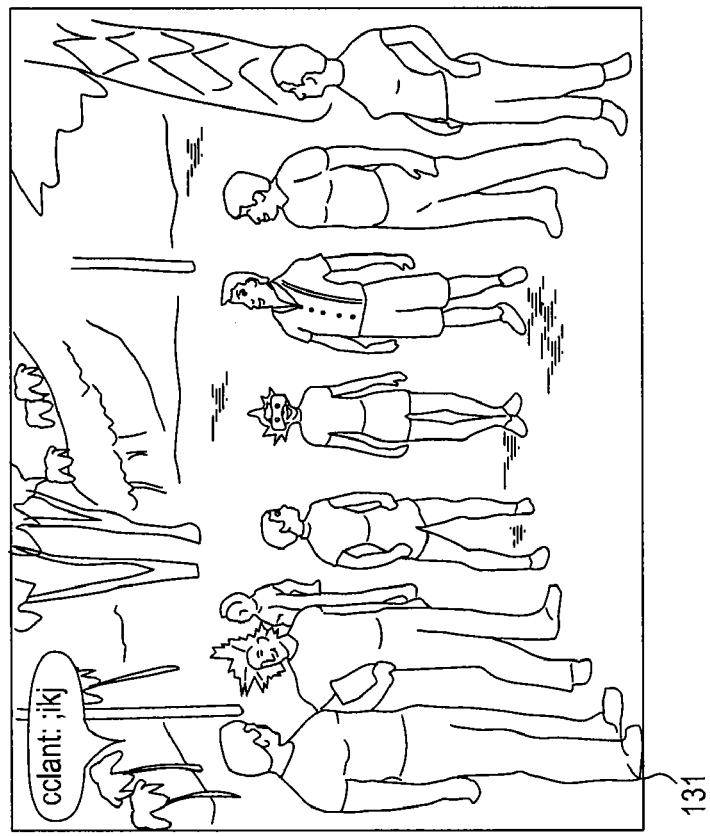
FIGS. 13A and 13B illustrate the use of an Auto-Chat Prop.
Figure 13A:
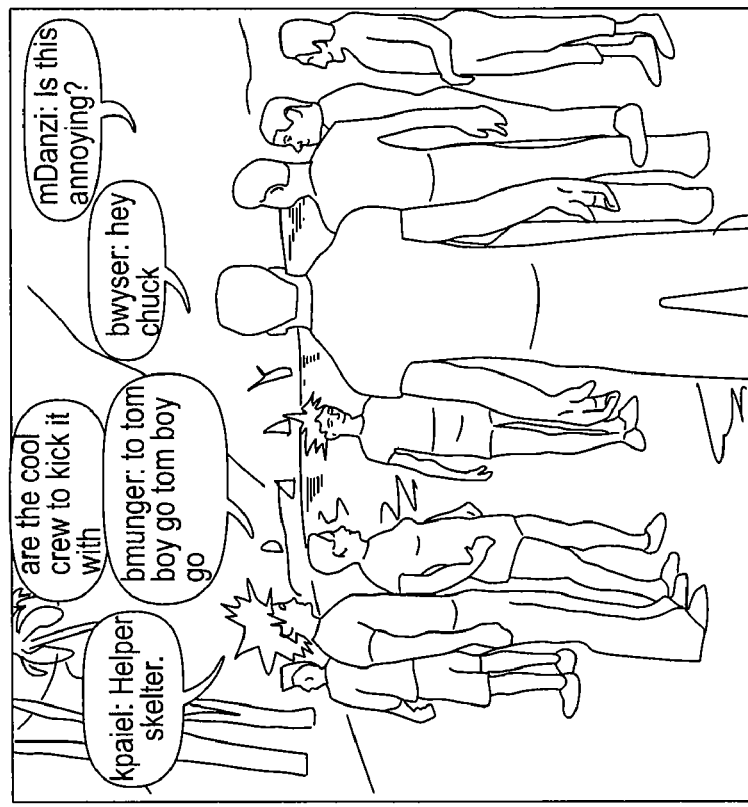

An Auto-Chat Prop can be described as an invisible Chat Prop (i.e., it has no furniture). An Auto-Chat Prop is created when two users face each other and begin talking to one another. Additional avatars can join by facing the Auto-Chat Prop and talking. The use of an Auto-Chat Prop is illustrated in FIGS. 13A and 13B. FIG. 13A shows an avatar 131 walking up to an already-formed Auto-Chat Prop occupied by several other avatars.

An Auto-Chat Prop forces avatars into specific slots, just like a Chat Prop, only the slots in an Auto-Chat Prop are normally for standing avatars. An Auto-Chat Prop can have multiple configurations, where each configuration has a different number of slots. As an example, a seven-avatar Auto-Chat Prop has a maximum of seven slots, but is initially formed in its two-slot configuration when two avatars approach and begin talking to one another. A maximum of five more avatars can then join the initial two avatars in this Chat Prop, forming a semi-circle, or horseshoe, formation. Each time another avatar joins the avatars already in the Auto-Chat Prop, the Auto-Chat Prop is reformed in a configuration that has a greater number of slots, until the maximum number of slots is reached. So, when a third avatar joins the first two avatars in the seven-slot Auto-Chat Prop, the Auto-Chat Prop is reformed in its three-slot configuration. However, the seven-slot Auto-Chat Prop will never have more than seven slots.

An avatar joins an Auto-Chat Prop by walking up to the Auto-Chat Prop, facing the other avatars in the Chat Prop, and talking. FIG. 13B shows the avatar 131 speaking to join the already-formed Auto-Chat Prop. When an avatar is added, it is moved to a slot close to where it was standing, and the other avatars automatically step sidewise to make room, as shown in FIG. 13B. If an avatar leaves, the group closes rank to stay in an appropriately spaced circle.

Ensuring Sufficient Space for the Group to Grow

At the point in which the two initial avatars start an Auto-Chat Prop, there is a check to be certain that there is room to accommodate the maximum number of avatars allowed by that Auto-Chat Prop. If it there is not enough room due to obstructions of other nearby Chat Props, terrain features, buildings, or other objects, then the two initiating avatars are moved a short distance to a location that does permit room. Auto-Chat Props also avoid cliffs and steep terrain. The bounding circle for this initial check is larger in radius than the area enclosing avatar slots, because it must also accommodate room for cameras so that they do not end up colliding with or penetrating an object (e.g., a hill).

When an Auto-Chat Prop forms on sloped terrain, the camera height is calculated from the average height of the terrain. If the terrain is too steeply sloped for this to work, the Auto-Chat Prop does not form. This test is performed before the Auto-Chat Prop is created rather than afterwards if needed, because this guarantees there will be no disruption to the conversation once it has started and begins to grow.

Another way to adapt to this situation is to permit a smaller Auto-Chat Prop to form when space is limited. For example, if there is not room for a seven-slot Auto-Chat Prop within a specified distance of where the first two avatars meet, then a four-slot Auto-Chat Prop can be substituted. Because of its smaller maximum size, this Auto-Chat Prop takes up less room and so is more likely to fit. The system is easily extended to also check for an even smaller Auto-Chat Prop, such as two-person Auto-Chat Prop.

So, in at least one embodiment of the invention, when two avatars take an action that would trigger an Auto-Chat Prop to form, an attempt is made to place the largest Auto-Chat Prop where they are standing. If the largest Auto-Chat Prop will not fit there, then an attempt is made to place it near where they are standing. If it will not fit nearby, then the next smaller Auto-Chat Prop is checked, first where they are, and then (if necessary) nearby. If that will not fit, then the next smaller Auto-Chat Prop is tried, and so forth, until there is no smaller Auto-Chat Prop, and no Auto-Chat Prop is formed at all.

Protected Regions—Avoiding Avatars Obstructing the View

An Auto-Chat Prop can have a "protected" region, i.e., a region in which avatars are not permitted to stand for long while occluding the camera's view. In certain embodiments, with the example of the seven-person Auto-Chat Prop which forms in a semi-circle, the main camera faces the open end of the group. If an avatar walks up to the Chat Prop, it may inadvertently walk in front of that camera. Therefore, that region (the open end of the group) is "protected"—when an avatar enters a protected region and stops there, a timer is started. After a delay, an action is taken to insure that the camera view for all of the avatars in the Chat Prop is cleared. One example of such an action is that the avatar is automatically moved (independently of user input) to the nearest edge of the protected region. Another example is that the camera is raised so that it is over the head of the avatar in the protected region, yet still keeps the other heads in view.

Chat Groups

When avatars are near one another and not in a Chat Prop or Auto-Chat Prop, they are considered to be in a "Chat Group". This situation could occur if there is no room for an Auto-Chat Prop to form, if an avatar does not face another avatar when speaking, or if an avatar approaches an Auto-Chat Prop but does not speak to join it. All members of a Chat Group are called ChatMates.

The Chat Balloons of avatars in a Chat Group with a user are set to high priority, as described above. When the user's avatar approaches another avatar closely enough to form a Chat Group, then all of the chatMates of the other avatar are added to the user's Chat Group. This insures that all of the avatars in a Chat Group share a conversational context (consistent with a main goal of Chat Props in general). If distance alone determined Chat Group membership, then the user might be in a Chat Group with one avatar and not with another, when those two avatars are in a Chat Group with each other. If that were allowed, a chatmate might be seen to respond to something said by an avatar that the chatmate can see but that the user cannot. Therefore, to ensure that everyone has the same high priority balloons, a Chat Group includes all of the chatmates of the user's chatmates.

C. Cinematics

In a simulation, it is desirable for the camera to ensure that avatars appear without overlap across the screen to ensure visibility, and so that Chat Balloons can be easily associated visually with avatars. This goal is facilitated by the left-to-right ordering of avatars across the screen. In accordance with the techniques described herein, avatars can have expressive body language that they can use during conversations.

Figure 14A:
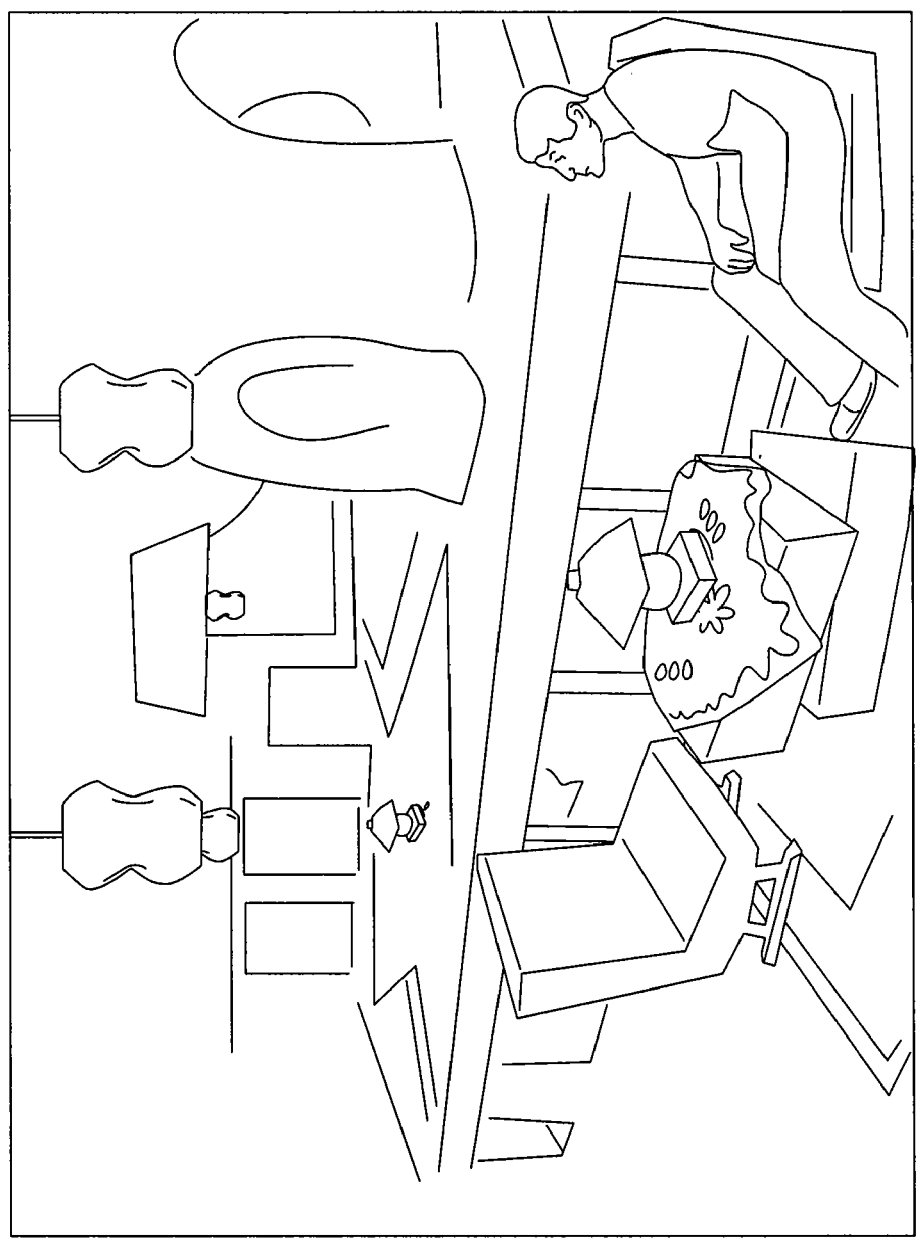
FIGS. 14A through 14C show an example of the use of multiple cameras in the same chat prop.
Figure 14B:
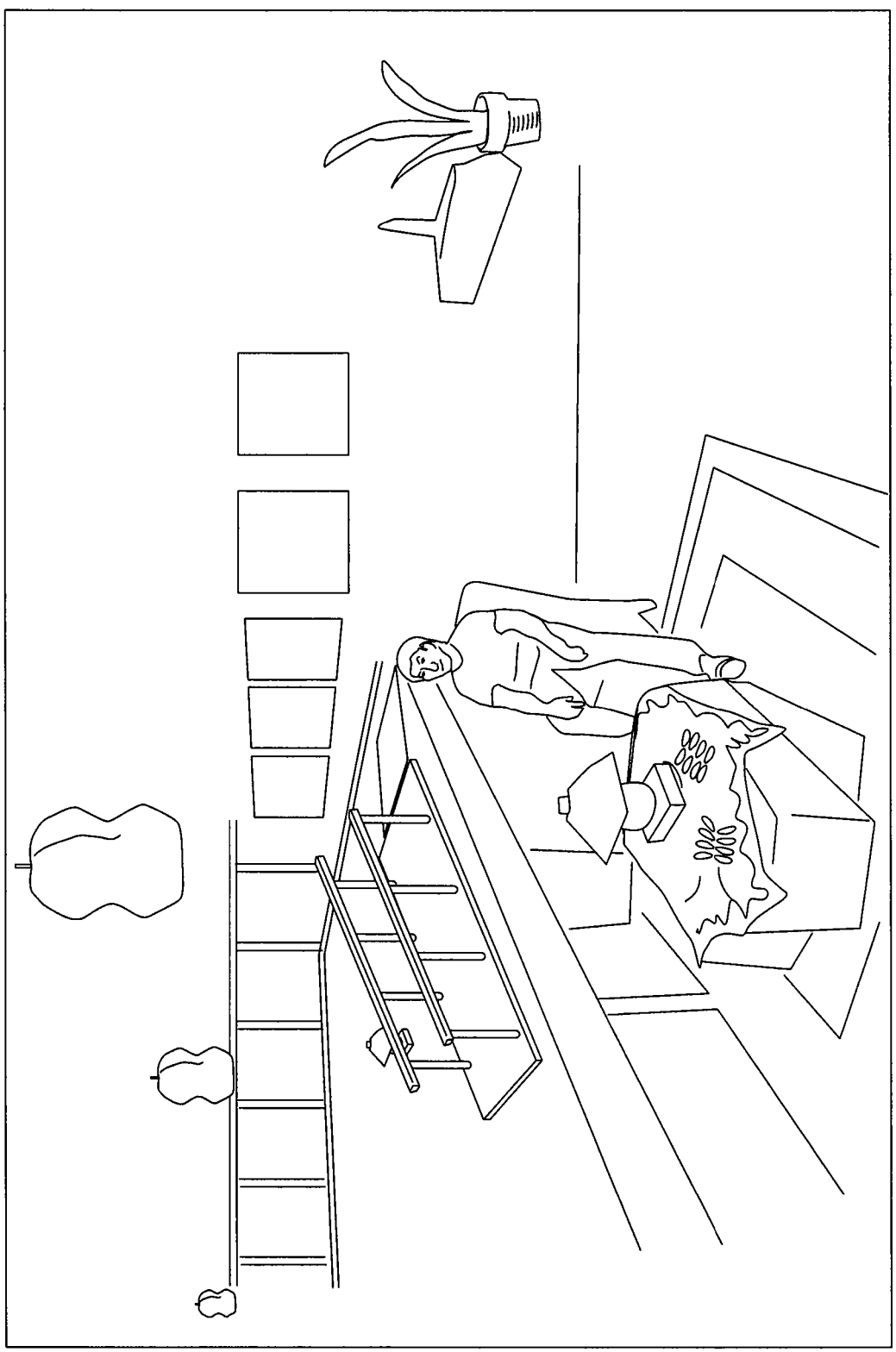
Figure 14C:

A camera can be used to create emotional impact from the expressions and gestures of avatars. However, certain embodiments or modes of use of the invention may use a third-person avatar camera (a camera positioned just above and behind the pilot avatar's head) for typical navigation in the virtual world. When that is the case, it is extremely difficult if not impossible for users to maneuver their avatars to see avatar body language and facial expressions well. Consequently, it is desirable for the camera to adjust during conversations, to make body language and facial expressions as clear and emotionally meaningful as possible. FIGS. 14A through 14C show an example of the use of multiple different cameras in the same Chat Prop.

Constrained Cinematics

While cinematics are useful in a virtual world, virtual camera behavior is difficult to build procedurally. That is, it is difficult to build computer code that is adaptive to unpredictable situations and can place the camera in the right place at the right time. In fact, since users may be able to stand their avatars almost anywhere, it is especially difficult to find a camera position that makes all participants in a conversation equally visible, let alone dramatizing their emotions. It is difficult to know when a user will want an adaptive, semi-intelligent camera versus when that would interfere with the user's intentions such that he would rather place the camera manually. Also, it is difficult to position and frame a camera shot correctly. This task becomes easier when avatars are joined to a Chat Prop. It is assumed that if users wish to have a context-based conversation, they are likely to appreciate some constraints and automatic camera behavior to help make the conversation effective. Chat Props make cinematic cameras easier to coordinate.

Each Chat Prop has a predominant camera selection style that determines how the camera choice depends on the user. In addition, Chat Props can have special cameras that are transient or are used for specific situations, all of which can be specified before run-time using a scripting language.

User-Selection of Cameras

Figure 15:
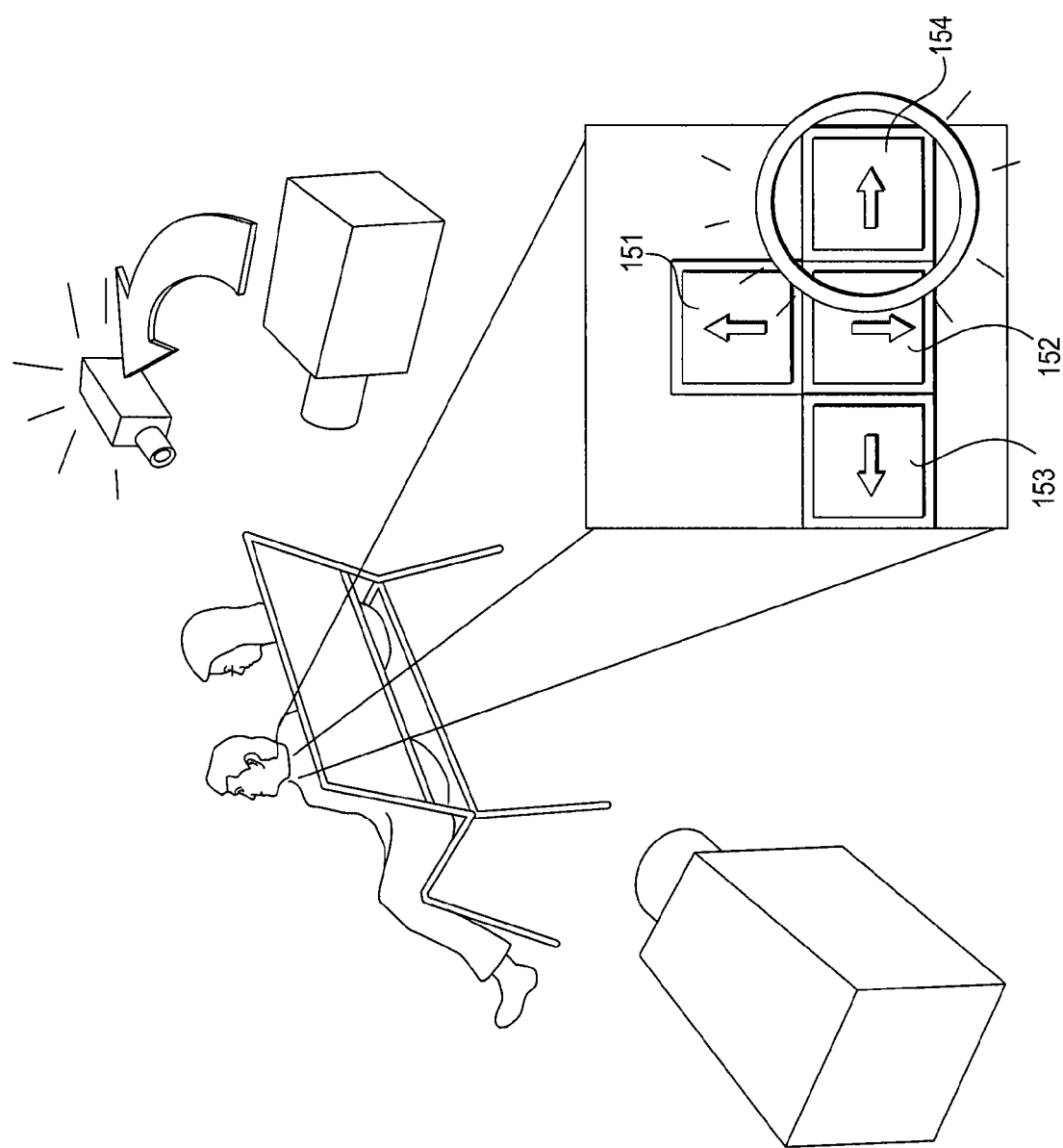
FIG. 15 illustrates how a user can select from among cameras in a chat prop by pressing an arrow key on the keyboard.

In certain Chat Props, a user can select from among cameras by pressing an arrow key on the keyboard, as illustrated in FIG. 15. The UP arrow key 151 can be used to move the camera in closer to a subject, while the DOWN arrow key 152 moves the camera back, and the left and right arrow keys 153 and 154, respectively, switch the view to cameras that shift or aim more to the left or right of the current view. This mapping of keys to camera behavior is advantageous, because it is easily discoverable and easily learned by new users, since in certain embodiments, arrow keys are already used to turn the avatar (and hence the avatar camera) when walking around in the world. Note, however, that alternatively, the numeric keypad or any button selection or other conventional user input control could as easily be used for manual camera control. A general scripting environment can be used to specify these mappings. Note that while it is not important which key is pressed, a single keystroke can cause a switch to a new camera view in an intuitive way, so that the user need not navigate his camera to find these good views. This approach greatly simplifies the task of viewing the Chat Prop conversation from multiple cinematic camera positions.

Switching Cameras and Adaptive Chat Balloons

Chat Balloon placement is view-dependent. Thus, when the user switches to a new camera view, the left-right ordering of avatars on the screen may change. If that occurs, the Chat Balloons must change columns to match. To avoid unnecessary column changing while the user is searching for the right view, this can be made to occur only after the frequency of camera switching by the user drops below a specified threshold, indicating the user has found a satisfactory view.

Camera/Avatar Pose Dependency

Chat Props typically have multiple cameras, though the style of selection can vary depending on the Chat Prop. The camera views available to each slot in a Chat Prop can be different from each other. In some Chat Props, the user can select a pose for his avatar, in which case a camera view is automatically chosen to emphasize that pose. In other Chat Props, the user can select among cameras and poses independently. In yet other kinds of Chat Props, the user selects camera views, and the camera view determines the pose of their avatar. All of these variations are possible, using a general scripting environment, for example. To elaborate on these varieties of Chat Props, three examples are given below:

1) The ChatStage
2) The LoveSeat
3) The Living Room

1) The Stage—Chat Prop with View-Based Avatar Poses

The Stage is a Chat Prop that can be used, for example, to give instructions to two teams before a game starts. It is important to the Presenter on the stage that the instructions are heard. The Presenter has a gavel expression that automatically causes all the audience members' cameras to face the stage (but users can look away whenever they want by changing their camera views with an arrow key.)

Figure 16A:
FIGS. 16A through 16C show an example of the Stage chat prop.
Figure 16B:
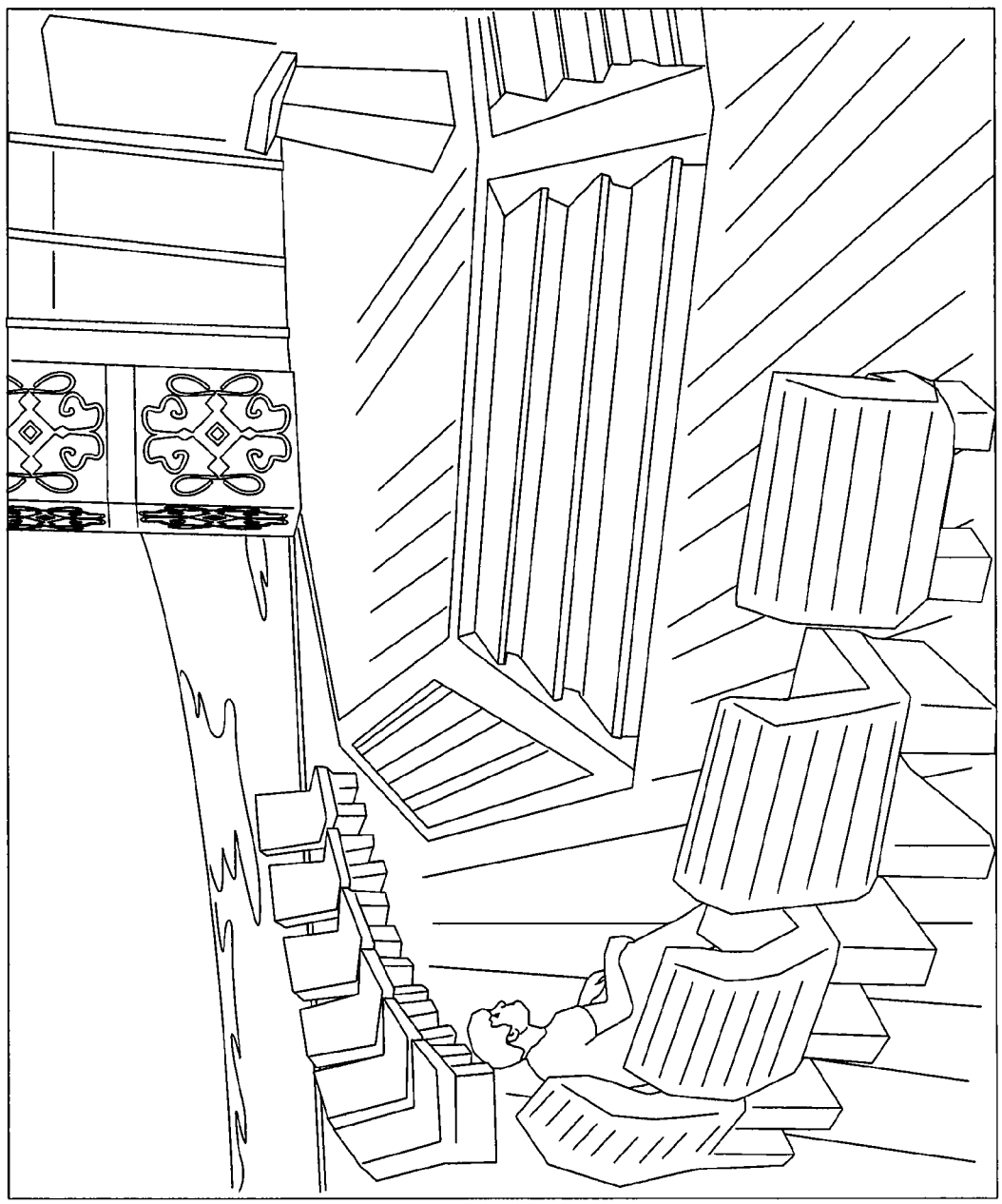
Figure 16C:
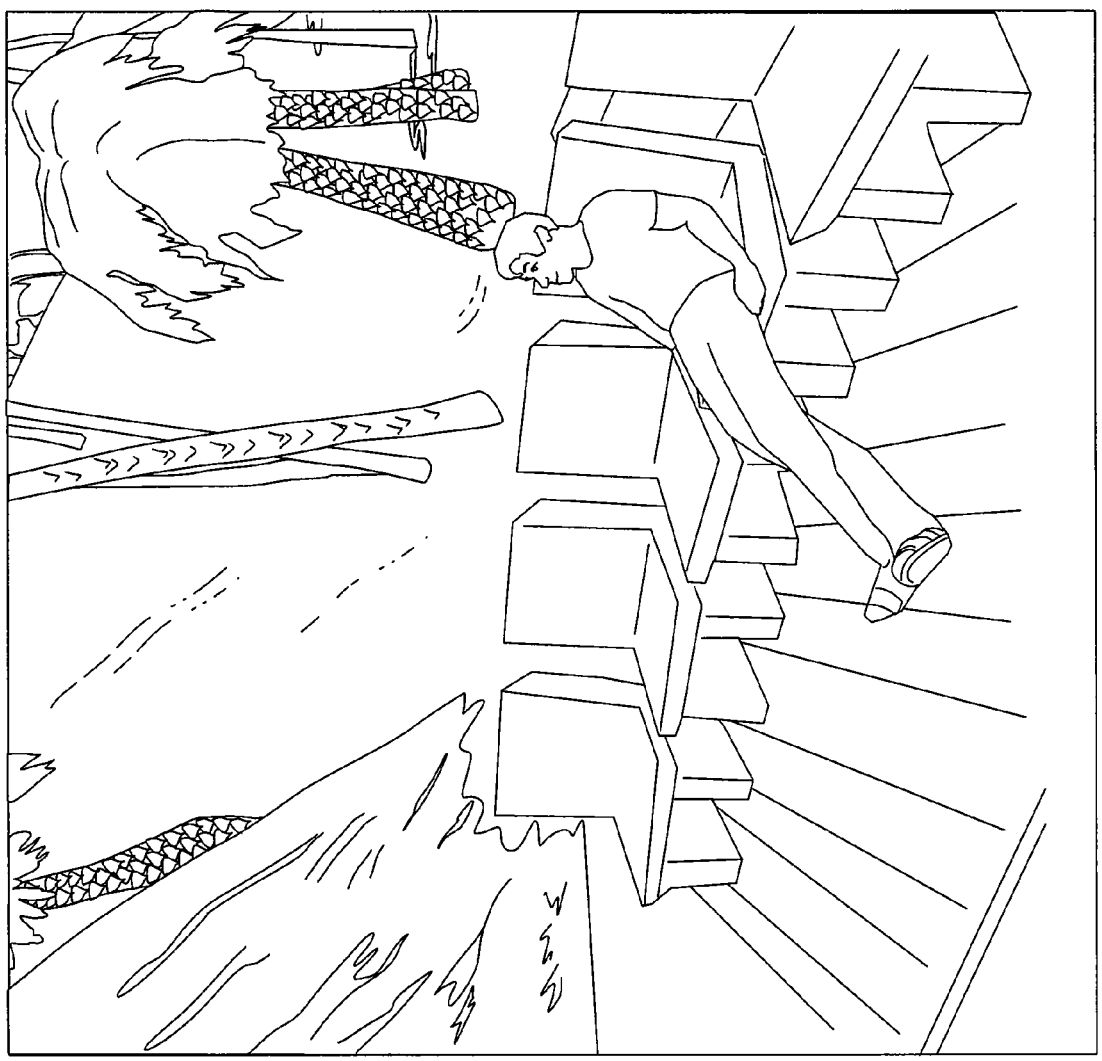

FIGS. 16A through 16C show an example of the Stage. As with most Chat Props, audience members in the Stage have multiple cameras. FIG. 16A shows a user's view of the Stage prior to sitting down. They have cameras for viewing the stage and parts of the stage more closely and cameras for viewing their own team face-on with the stage out of view. Since it is important for the Presenter (not shown) to know whether the audience members are looking at the stage, audience member poses depend upon their selected views. When an audience member (a user) is looking at the stage, his avatar pose sits forward attentively in its seat, as shown in FIG. 16B. When the audience member is looking at his team, the avatar pose is slouched backwards in its seat, as shown in FIG. 16C. Because these poses are visible to the Presenter from the stage, the Presenter can see who in the audience is paying attention and who is not.

Thus, the Stage is an example of a Chat Prop where the user selects a view and their avatar assumes a pose that informs others about that view.

2) The Love Seat—Chat Prop with Pose-Based Views

Figure 17B:
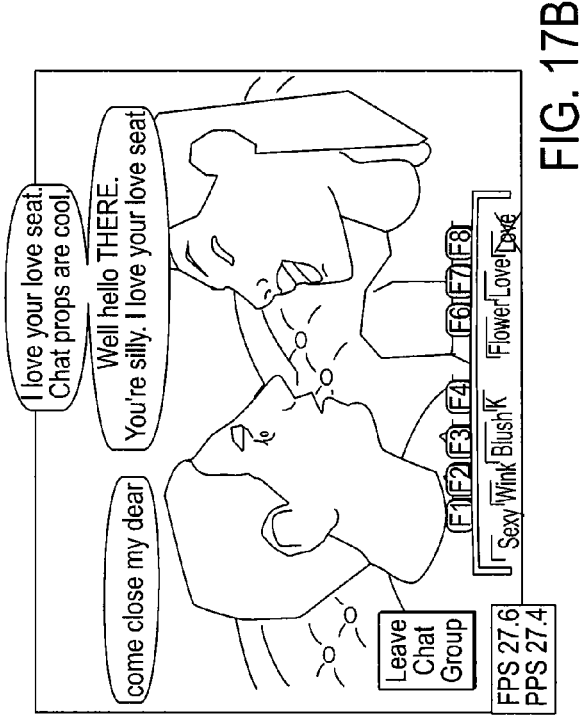
FIGS. 17A through 17C illustrate an example of a Love Seat chat prop.
Figure 17C:
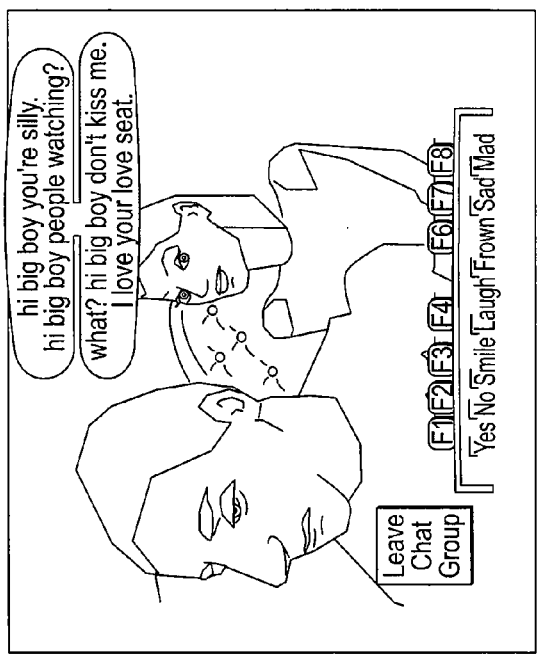
Figure 17A:
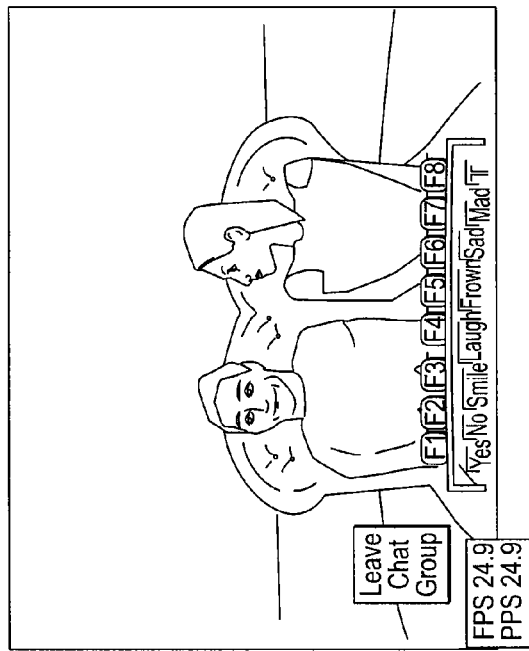
Figure 18B:
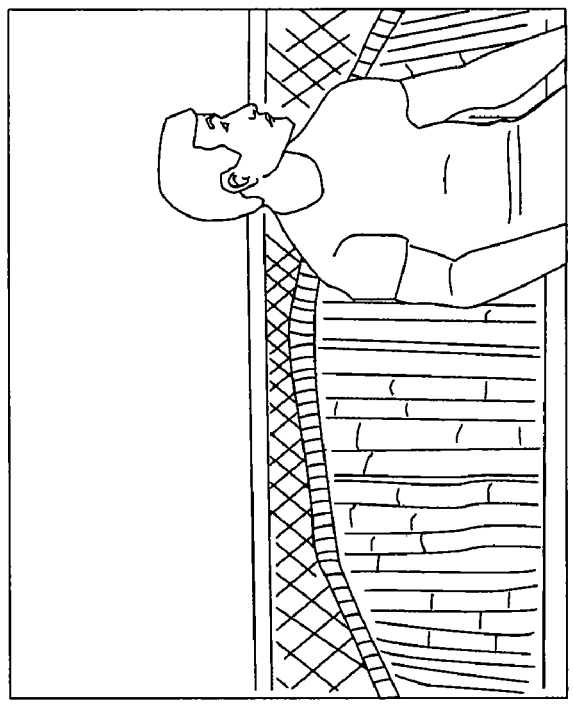
FIGS. 18A through 18F show a set of camera views of a Spa Chat Prop.
Figure 18A:
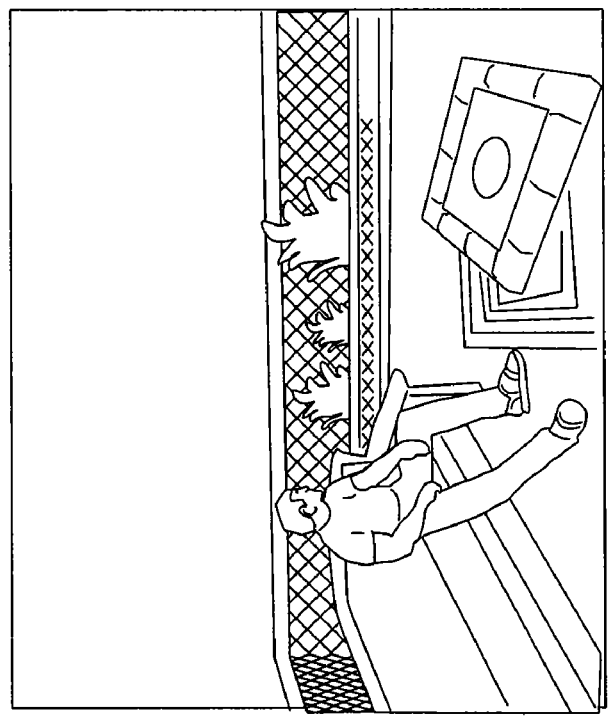
Figure 18C:
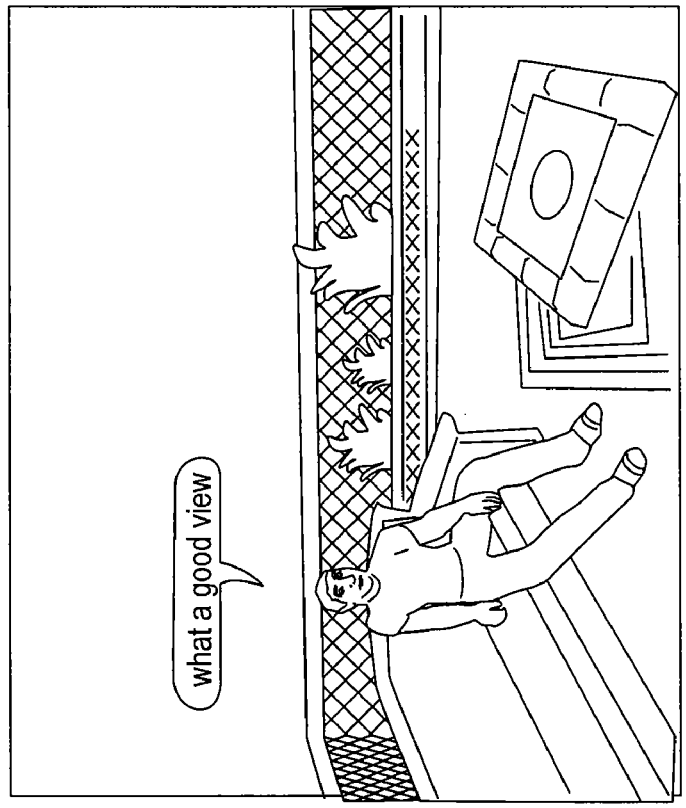
Figure 18D:
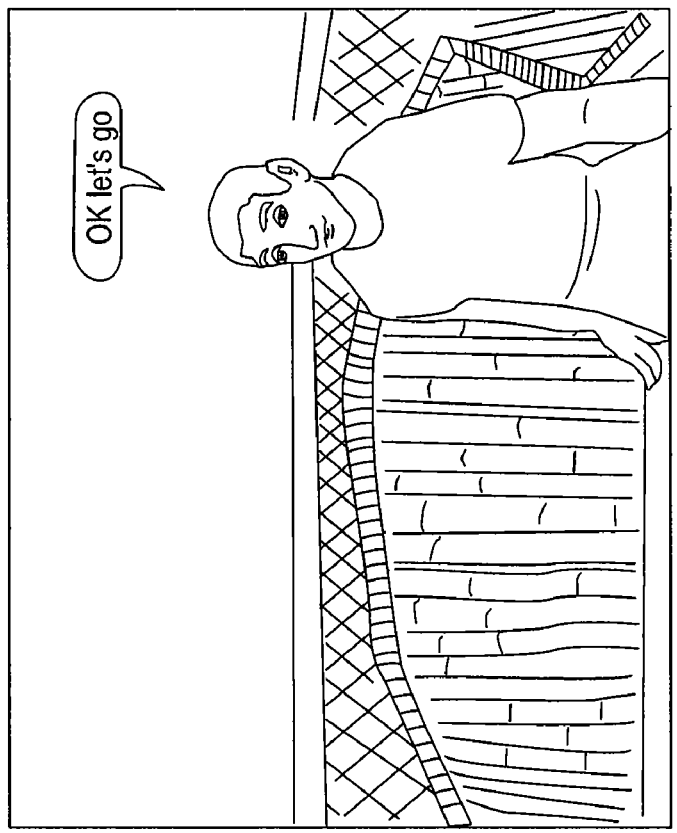
Figure 18F:
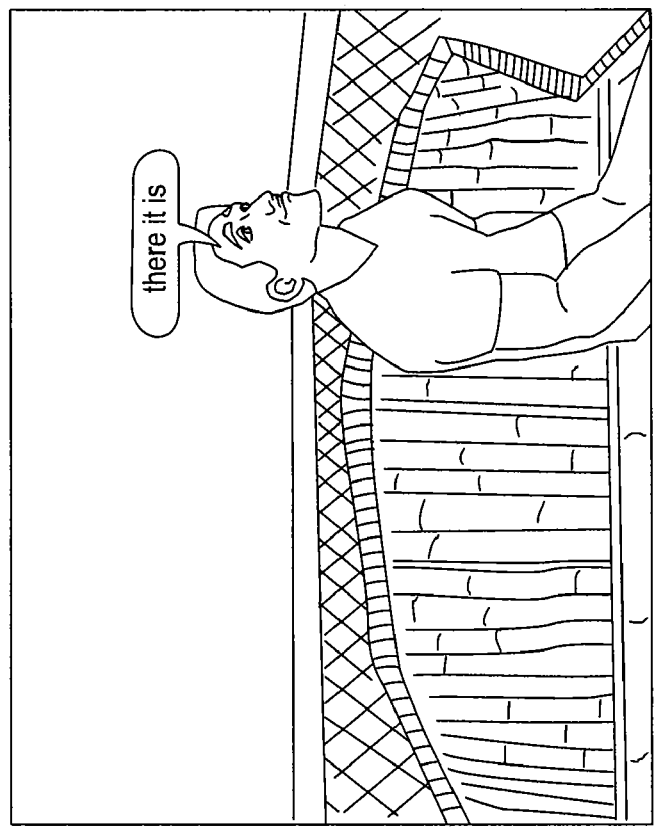
Figure 18E:
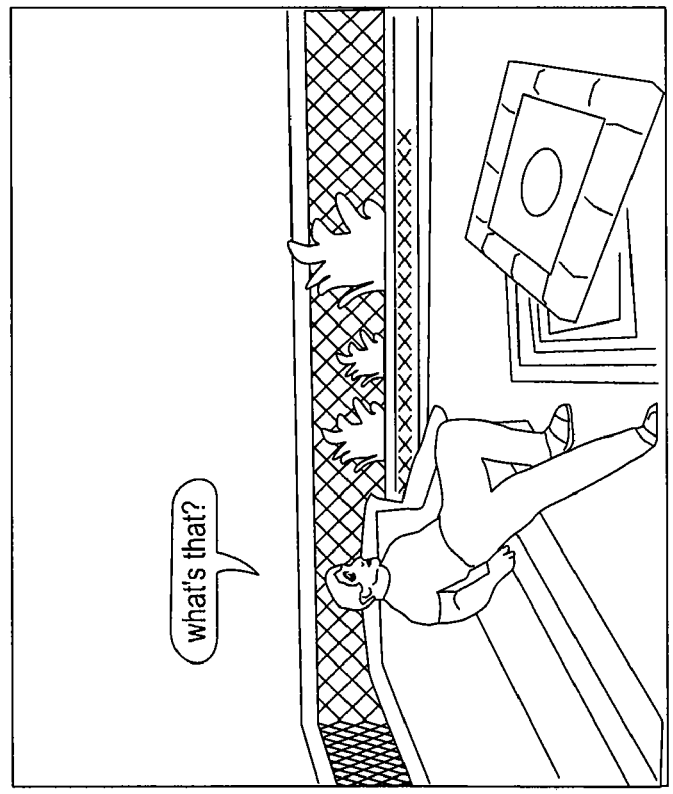

The LoveSeat is an example of a Chat Prop designed for emotional and intimate conversations. In the Love Seat, avatars can banter, flirt, and argue. Thus, the user focuses on his body language, while the camera automatically switches to highlight the body language. This Chat Prop is illustrated in FIGS. 17A through 17C. Because this is intended to be an emotionally strong Chat Prop, the relationship between pose and view are reversed from that of the Stage. In this Chat Prop, the user selects a pose and the camera view is chosen based on the pose, to emphasize the emotional relationship between the two avatars.

For example, if the two avatars lean toward one another, both their cameras push in to a head and shoulders shot from the side, emphasizing their intimacy, as shown in FIG. 17B. If one avatar then turns to face away from the other, the camera moves to an over-the-shoulder shot off to the side of the Love Seat to view the faces of both avatars, as shown in FIG. 17C.

3) The Living Room—Chat Prop with Independent View and Pose

Most Chat Props are much more versatile than the Chat-Stage or Loveseat described above, because they serve a much wider range of user's needs for conversation. For example, a living room may have two chairs and a sofa. This Chat Prop might be used for flirting, but it can also be used for many other kinds of conversations. It has cameras to view the entire Chat Prop from any side, and close-up cameras that close-in on the individual chairs and sofa.

FIGS. 18A through 18F show a set of camera views of a Spa, another Chat Prop with independent view and poses. These figures show two different camera views, selectable by the user, as well as several different poses which are also selectable by the user. In a typical embodiment, any pose can be seen in any view.

Other Versatile Chat Props

A bench on a ridge overlooking a lovely valley might also be used for flirting, but the two users may want to just look out over the valley and talk. Such a Chat Prop can have cameras that show the Chat Prop from all sides, but also a view camera in front of the bench where the bench is not on the screen at all.

Hence, in some Chat Props, users have control over both their pose and their camera view, and these two do not affect one another. The user may choose to have his avatar lean forward in a chair in the living room to show that he is very interested in the conversation, but then select one of the side cameras that shows the faces of those in the Chat Prop they most want to see at the time.

Camera Sequences (Cut-To's, Straight Dolly's, and Revolving Dolly's)

The change to a camera can be done with either a "Cut" or a "Dolly". The term "Dolly" refers to a conventional camera motion used in film by way of a constrained vehicle on tracks or wheels, allowing the cameraman to move the viewpoint in a straight line or to revolve it around the subject. In a "Cut", the camera switches instantly to the new camera view. In a Dolly, the camera moves smoothly to its new position, with ease in and ease out motion (the camera speeds up at the start and slows down at the end of the movement in a natural way). In certain embodiments of the invention, the camera is dollied most of the time, because it helps the user understand what is happening better by maintaining spatial context. Otherwise, it may take a moment for the user to figure out where the camera has just moved.

However, often the camera cannot dolly in a straight line. For example, the camera may have to revolve around a slot or a group of slots, tracing an arc. A straight dolly would cause the camera to go through an avatar's head. Thus, the camera can be caused to move in an arc about the subject matter to avoid such collisions. For total control, parametric arcs are not used, but rather, the arc is defined by way of a series of waypoints (individual camera positions and heading) arranged in a freeform arc trajectory, through which the dollying camera passes. The arc does not have to conform to a perfect circular section, and can thus be tailored to the specific geometry of the scene. When a dolly view change is triggered, the camera dollies from its starting position to the waypoints, and then to its destination. There can be as many waypoints to define the camera path as needed. When the camera is dollying along this path, the ease in and ease out motion control applies to the path as a whole, not individual segments of it, giving the whole movement a feeling of completeness without any jumps and starts.

Chat Prop Behaviors Modifying Camera

Figure 19:
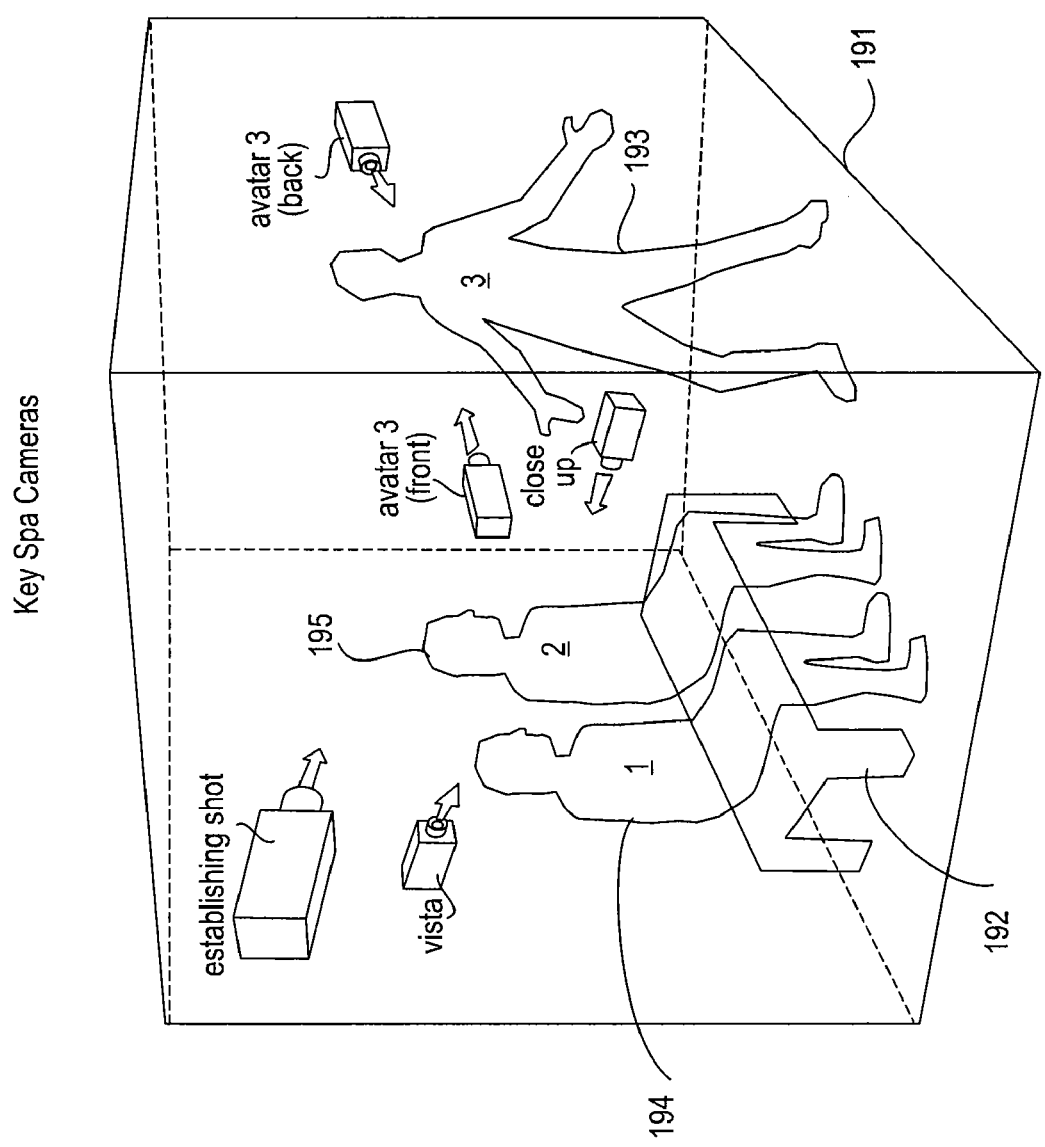
FIG. 19 shows a treatment slot in the Spa Chat Prop.

Referring to FIG. 19, the Spa Chat Prop may include a standing treatment slot 191 where a user can make changes to his avatar's body 193 (using a graphical user interface on his local machine), and a bench 192 where two other avatars 194 and 195 can sit and watch, to provide advice or comments about the body changes. In this Chat Prop, the body changes can alter the available cameras. So, if the treatment reshapes the avatar's buttocks, then when any of the avatars in the Chat Prop pushes his camera in to a close up of the avatar on the treatment slot, the camera moves in at the appropriate height for viewing the buttocks. If the treatment changed the nose length, then the camera would push in on the face.

Procedural Cameras

Most of the cameras described above are "fixed" cameras. That is, their positions, orientations, and fields of view are pre-determined as part of the design of the Chat Prop and never change. However, a Chat Prop can also use procedural cameras, i.e., cameras whose parameters are determined at runtime.

Cut To Face Camera

Figure 20:
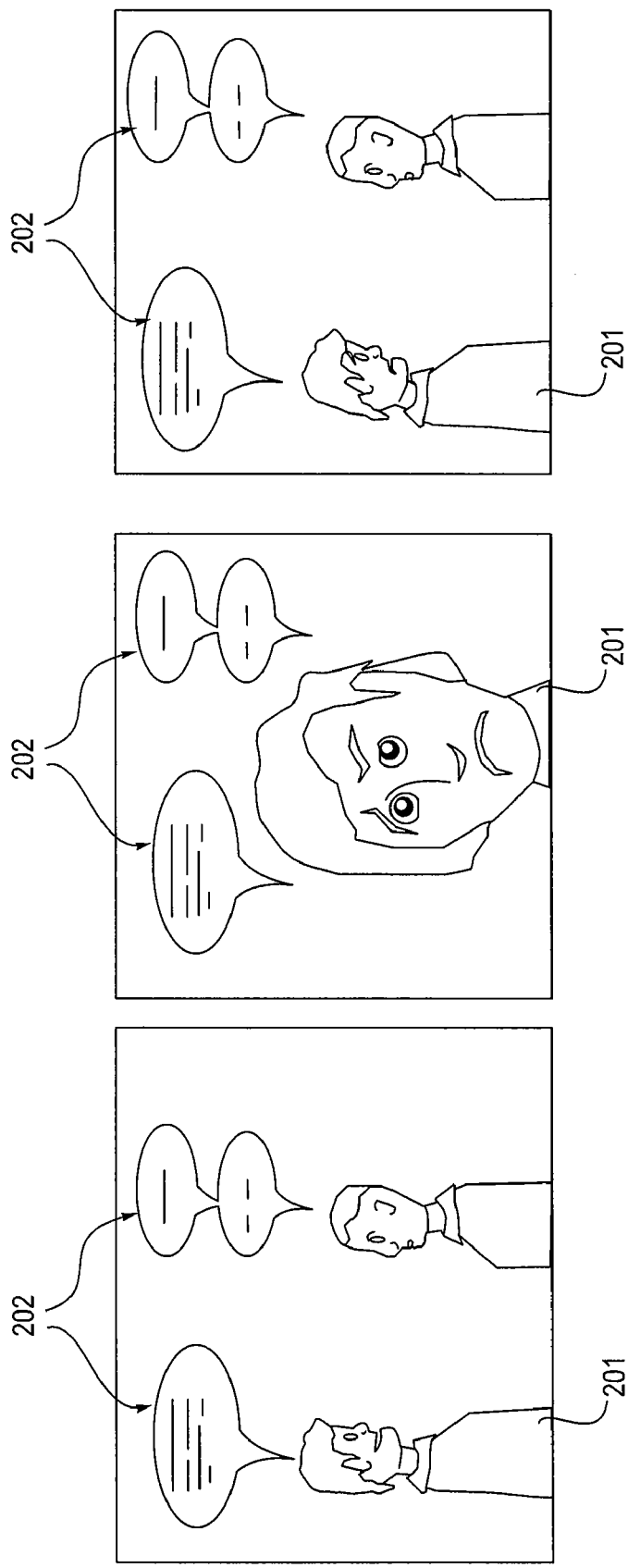
FIG. 20 illustrates the use of a Cut To camera shot during avatar chat.

When the user's avatar is in a Chat Prop and another avatar in the Chat Prop makes a facial expression, the user's view may briefly CutTo a close-up of the face of the expressing avatar. This is a very powerful cinematic technique, however it can be disruptive. To avoid interrupting the user's reading of the Chat Balloons, the Chat Balloons are "frozen" during this brief camera change. Frozen Chat Balloons can still have chat added to them, and move upwards in the normal way, but they do not change columns to reflect the change in the avatars on the screen. FIG. 20 illustrates this technique, i.e., how when an avatar 201 makes an expression causing a brief camera cut-to, the Chat Balloons 202 stay in place to avoid user disorientation.

Cameras can be turned on or off for any view and avatar slot. In certain embodiments, Chat Props that are shared by avatars of users who have no relationship to one another, such as the Stage, do not have CutTo's of audience members, because they could be used aggressively to disrupt the experience. However, audience members still have CutTo's of the Presenter so that they can see expressions that would otherwise be too far away, but only when in a camera view that shows the stage.

CutTo cameras can also be turned off in a Chat Prop depending on the number of people in the Chat Prop. When two people are sharing a living room Chat Prop that has five slots, CutTo's are valuable. But when all five slots are full, they can be too disruptive. So, the Chat Prop can be configured, using a scripting environment, to only allow CutTo's below a certain number of occupants. CutTo cameras have other uses as well. For example, when an avatar joins or leaves a Chat Prop, the other avatar's can get a CutTo an "establishing" shot camera of the entire Chat Prop that shows what is happening.

The CutTo camera described above is an example of a procedural camera. When the camera Cuts to a view of an avatar's face, the camera is placed a certain distance in front of the avatar's head and faces it. That head position can change at any time, when the avatar's pose changes and when it looks around at other avatars, so the CutTo camera cannot be fixed. Its position has to be calculated at the beginning of each instance of its being used.

Intimate Cameras

Another example of a procedural camera is the Intimate Camera. This camera is used for two people sitting on a seat for two, or any Chat Prop where the avatars are close to each other. The Intimate Camera frames the two avatars appropriately. When the avatars lean closer toward one another, it moves closer. When they pull back from each other, it pulls back to keep them both on the screen.

Figure 21:
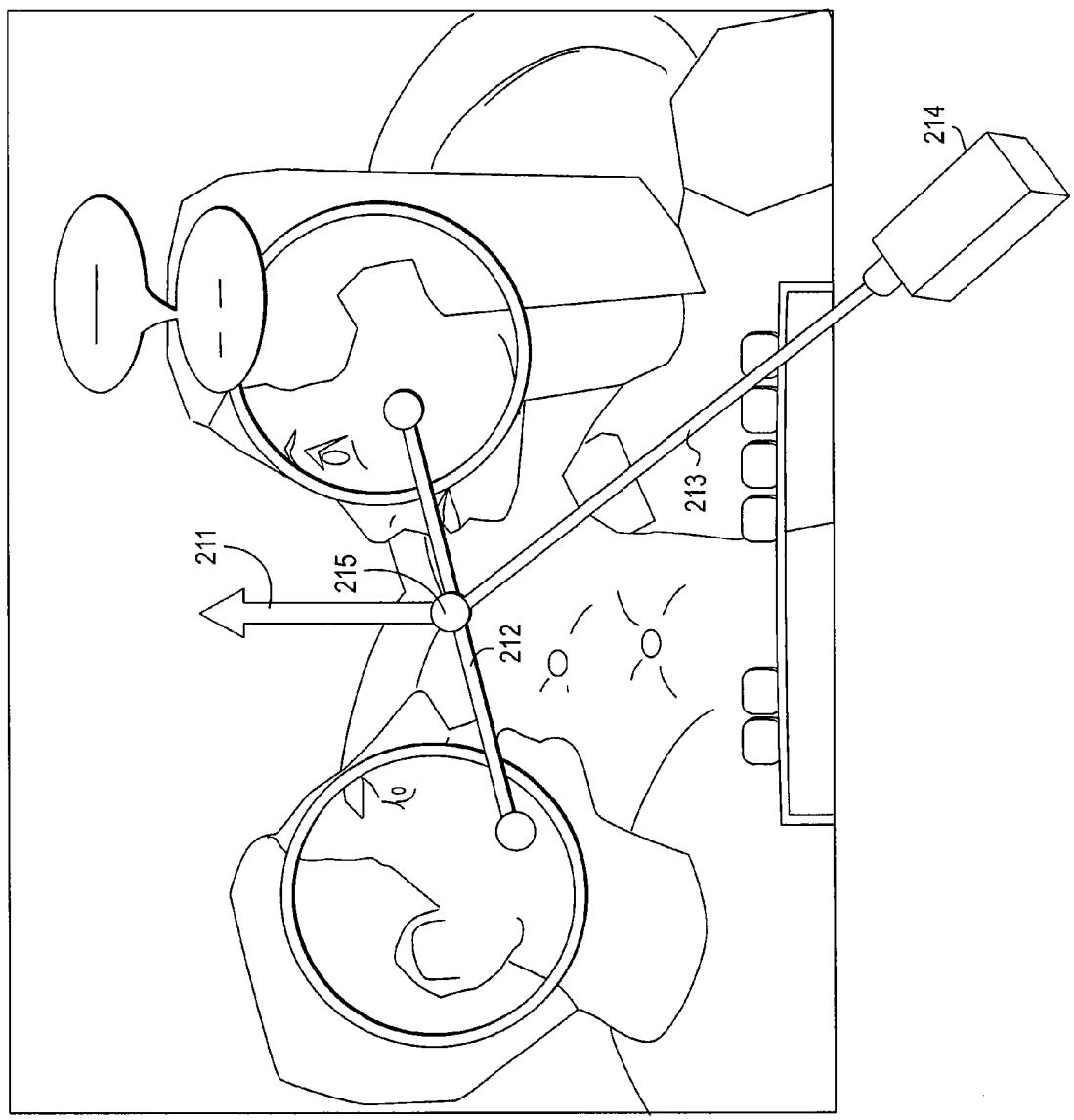
FIG. 21 shows the use of vectors to determine the position of an Intimate Camera.

The intimacy of the avatars is inferred by avatar head distance and is echoed in the camera's closeness to the subject. Various functions of the intimate camera allow speed of adjustment, minimum distance, maximum distance, and other aspects to be set in a scripting environment, so as to provide custom emotional flavors to Chat Props involving two nearby avatars. FIG. 21 shows how the up vector 211 is crossed with the gaze vector 212 to create the zoom vector 213, at the end of which the Intimate Camera 214 is placed. The distance of the Camera 214 from the mid-point 215 of the gaze vector 212 is a function of length of gaze vector 212, the endpoints of which are predetermined points in each avatar's head.

Non-User Camera Control

At times, it is useful for the user's camera to be changed as a result of an outside action. One example of this is the gavel "emotion" (described further below) for the stage presenter. There are other examples of non-user camera control:

Synchronized Cameras—The Microphone Example

In the stage Chat Prop, the Presenter can use a special expression to send a "microphone" to an audience member. That audience member then stands up and the cameras of all the other avatars in the Chat Prop turn to face this new speaker. The speaker can change views so that the camera shows the speaker and the stage or the camera shows the speaker and his team. When the speaker changes views in this way, everyone else's view changes in concert. So, the speaker controls everyone's view. When the speaker relinquishes the microphone with an expression or the Presenter takes it back, the speaker sits back down and everyone's view reverts to what it was before.

In this Chat Prop, as mentioned above, anyone can hit an arrow key (or other similar control) to change views. This changes the user's view back to his view prior to the speaker view and restores control to his own camera. This same technique can be used to create a "cameraman" for an event. The cameraman would choose a view of the event and all of the audience members would have their view change in concert.

V. Avatar-Centric Expressive Communication

Communication and emotional expression are a compelling attraction of 3D virtual worlds. However, users of virtual worlds have more than text with which to communicate. They have a character in the world that they control, called an avatar. In most virtual worlds, conversation is almost identical to chat rooms and instant messaging, where the user has no virtual body. In the real world, our bodies and faces are expressive, informational, and subtle, comprising a large proportion of what we are communicating all of the time. The present invention allows an avatar's face and body to be used for communication in the virtual world. Accordingly, introduced herein are techniques for providing avatar body language, to add layers of meaning, emphasis, and even irony, to the virtual world. Such affectations are not possible in text-only communication.

The invention addresses this problem of centering communicating in a 3D world on the avatar as the instrument of communication, hence the term, "Avatar-Centric Communication (ACC)". The aspects of ACC relating to expression and body language are described further below.

The system of emotional expression has the following three basic components: 1) user-triggered "emotions" (see definition of "emotion" above); 2) emotions and gaze inferred from conversational content; and 3) mood and its influence on avatar behaviors. The combination of these three simultaneous layers provides continuous avatar body language that expresses the user's emotional intent richly.

A. User-Triggered Emotions

"Emoticons" of the sort used in text-only chat, such as ":-)" and ":-(", are not rich enough to provide fully expressive communication in a virtual world. There are emoticons for common expressions such as smile and frown, but users may also want to be able to wave and jump for joy and express many emotions that do not have emoticons. Conventional emoticons have other disadvantages. Rare emoticons are often obscure and difficult to remember, and even common ones are not always obvious to the user. The difference in meaning between :-(and :-[is not obvious to most users, and differs among chat circles.

Figure 22:
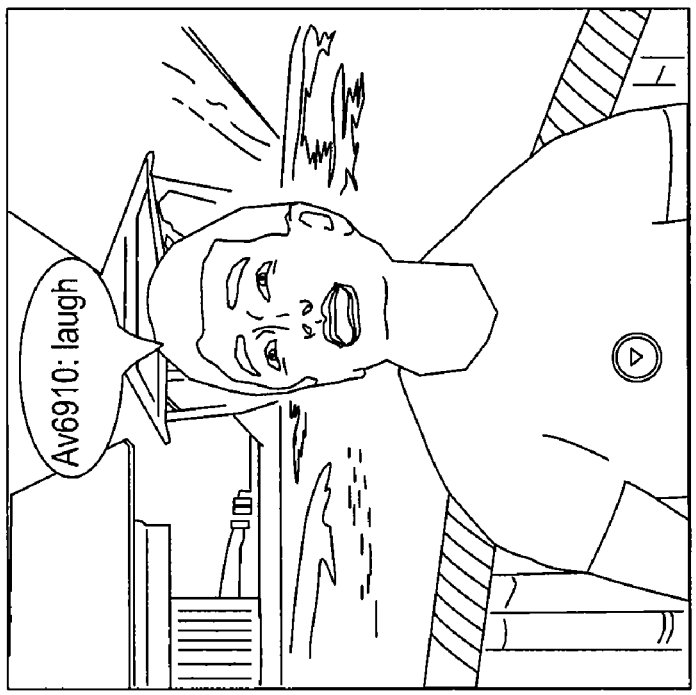
FIG. 22 shows a laugh emotion of an avatar.
Figure 22:
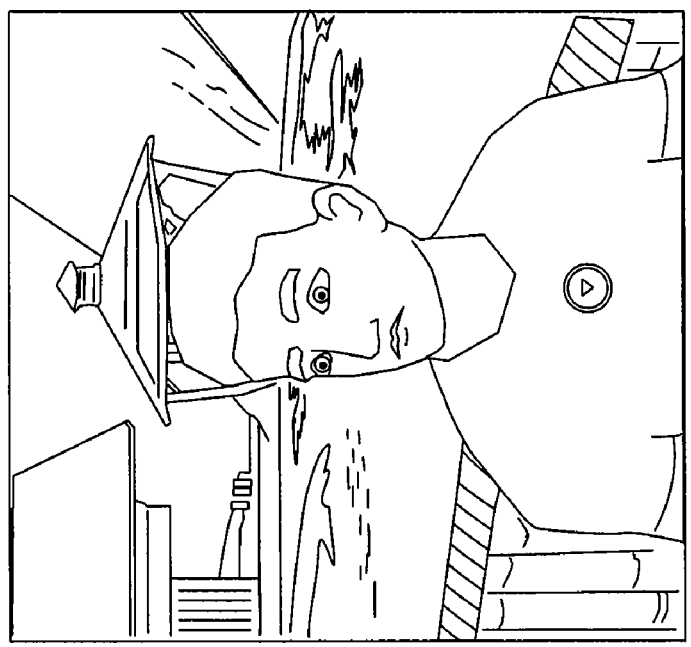

Therefore, introduced herein is an emotion-based language, referred to as the "emotions language". The emotion language introduced herein is richer, more universal, and easier to use than standard emoticons. In a basic embodiment, users can trigger single, explicit emotions. FIG. 22 shows an avatar whose user might be listening to a joke (shown by the neutral expression in the left frame), then a moment later the user has triggered the laugh expression (right frame).

Basic Emotion Components

Emotions in accordance with the invention can include any combination of the following five features:

| | |
|---|---|
| facial expression | examples: smile, coy |
| body gestures | examples: wave, shrug |
| face color changes | examples: blushing, green-with-envy |
| bubbling moodicons | examples: hearts, Z's, |
| two-person traveling moodicons | examples: daggers, hearts |
| sounds | examples: fart, whistle |

Figure 23:
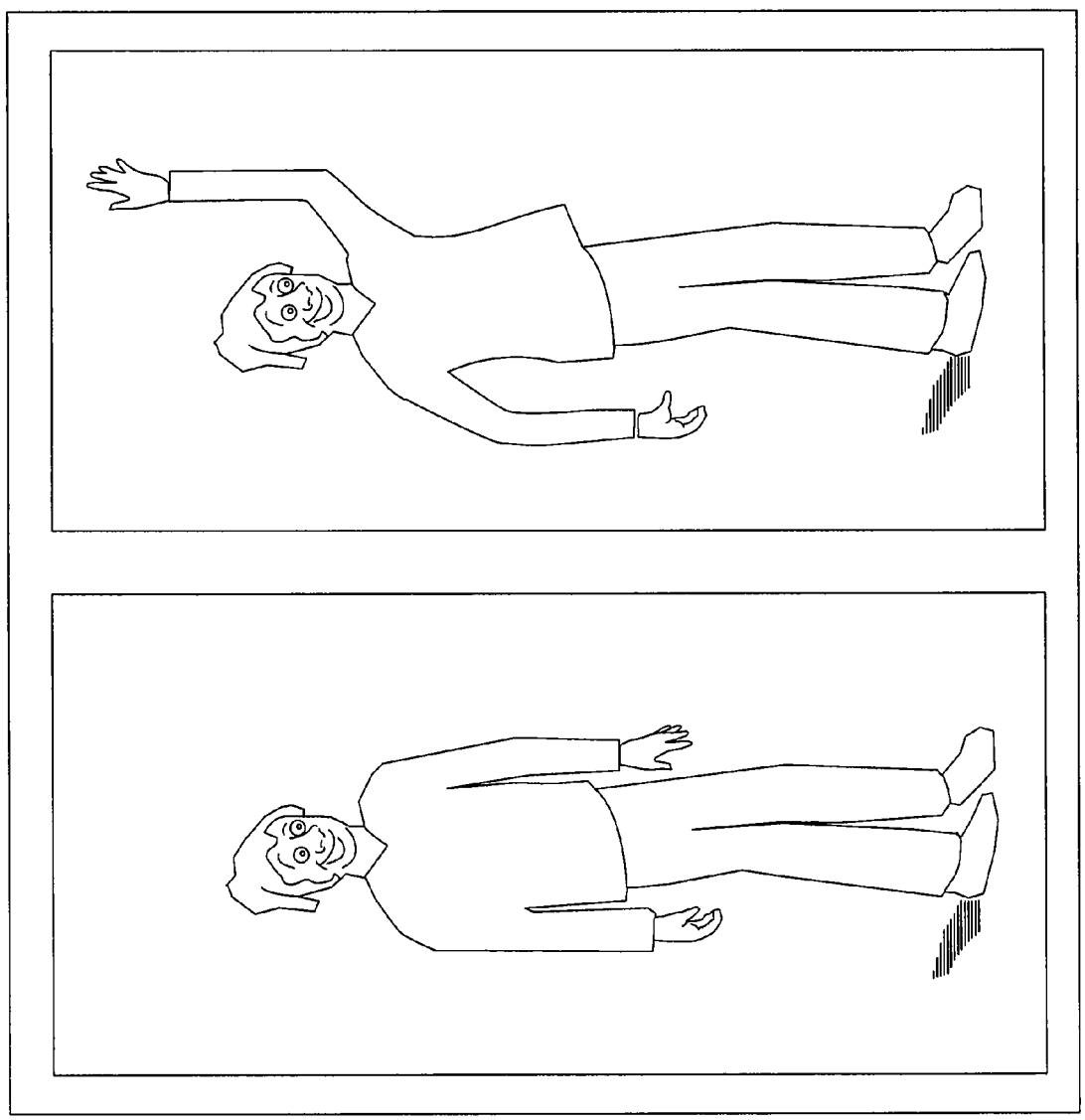
FIG. 23 shows a wave emotion.
Figure 24B:
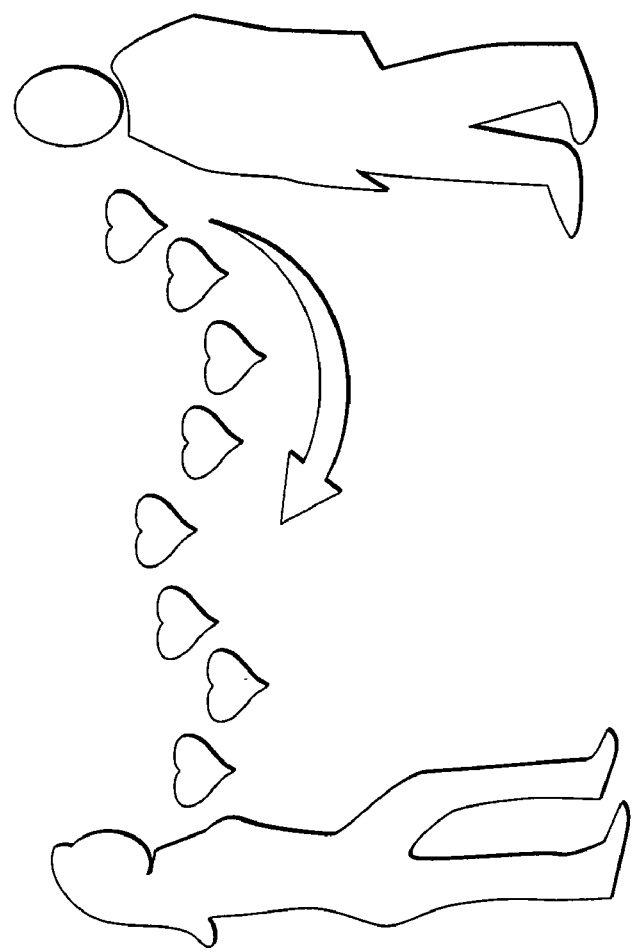
FIG. 24B shows a two-person traveling moodicon emotion.
Figure 24A:
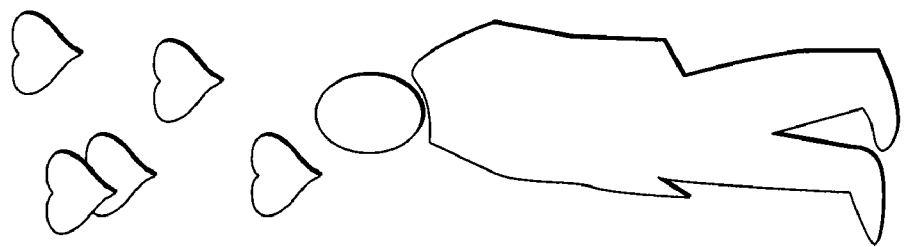
FIG. 24A shows a bubbling moodicon emotion.
Figure 26:
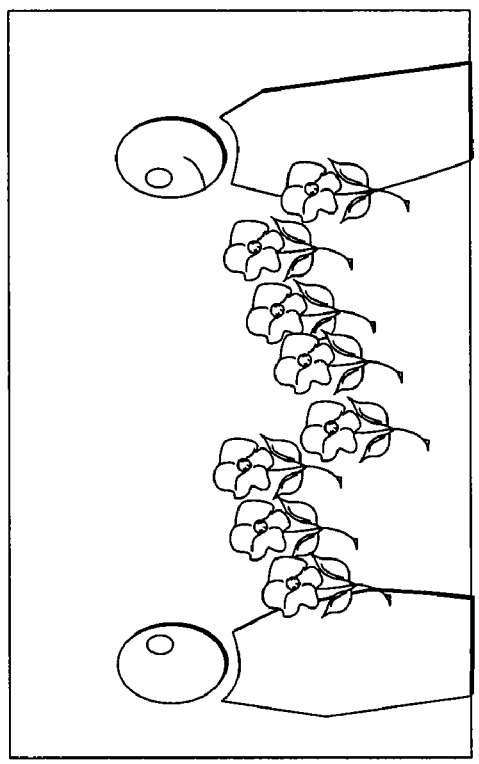
FIGS. 25 and 26 show two different bubbling moodicon emotions.
Figure 25:
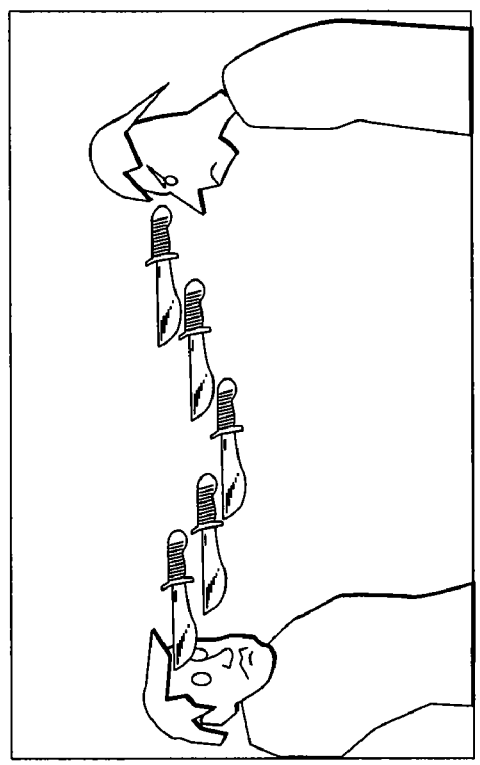

Illustrated in FIGS. 23 through 26 are several examples of emotions. FIG. 23 shows a "wave" emotion, which is a gesture. FIG. 24A shows a "hearts" emotion as a bubbling moodicon. FIG. 24B shows the "hearts" emotion as a two-person traveling moodicon. FIG. 25 shows a "daggers" emotion as a two-person traveling moodicon. FIG. 26 shows a "flowers" emotion as a two-person traveling moodicon.

Each two-person moodicon has a source and destination point on the avatar. For example, when an avatar is looking at another avatar, the "daggers" moodicon, shown in FIG. 25, will emanate from the head of the emoting avatar and travel to the head of the look-at target. "Hearts" causes heart symbols to travel from the chest of the sender to the chest of the recipient.

While any single component could be played separately, many occur in combination, such as a sweeping harp chord that accompanies the hearts traveling moodicon or a proud body gesture with a proud facial expression.

Another benefit of this technique is the ability for avatars to express some emotions partially, due to constraints on other parts of the body. For instance, an avatar sitting in a Chat Prop may not be able to animate the laugh gesture if that emotion only works in a free-standing avatar; however, it can still animate the laugh facial expression. This constraint is acceptable, especially if the camera view is cutting to the avatar's face.

Triggering Emotions

Emotions can be triggered in any of a number of ways, such as pressing keys on the keyboard, using the mouse to click on icons, and typing special code words into a Chat Balloon. The last-mentioned method is referred to herein as the "Smiley language", to facilitate description.

The Smiley Language

To trigger an emotion using the Smiley language, the user types a code word into the Chat Balloon, preceded by one or more special characters, such as the single-quote character. In that case, for example, typing 'smile causes the avatar to smile and 'wave causes the avatar to wave. Such combination of an emotion word preceded by a special character is referred to herein as a "Smiley", to facilitate description. Smileys can use well-known words for emotions and are thus easy for users to learn and discover. However, standard emoticons such as :-) can also be used to cause a gesture or facial expression. Essentially any ASCII string can be used as a trigger for an emotion.

Figure 27:
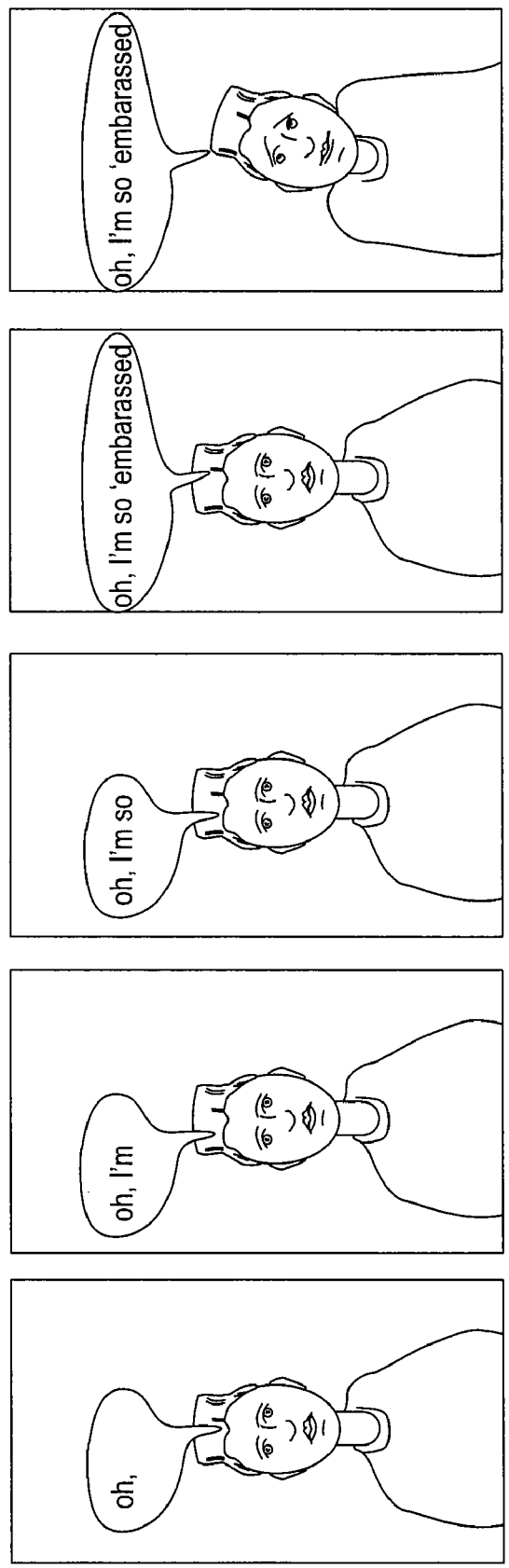
FIG. 27 illustrates how the Smiley language allows concurrent display of avatar emotions with their associated text.

Smileys are typed as part of the user's chat text. Smileys appear in the speaker's chat by default, and so they are distributed. Thus, everyone can see Smileys, and they can be part of the statement as well as the trigger for an emotional animation. For example, a user might type, "Oh, I'm so 'embarrassed", such that 'embarrassed causes the pilot avatar to blush. This example is shown in FIG. 27. Everyone nearby (in virtual space) can see that statement, including the Smiley and the resulting blush emotion on the avatar. This has the added benefit of making it easy for onlookers to learn how to make their own avatars use Smileys.

Transmitting Smileys in Chat

In certain embodiments, the chat system sends each word over the network as soon as it is terminated by a space, return, or punctuation mark. Sometimes users may type a word and then stop, expecting that others have seen it because it appears on their screen. So, after a delay, a word can be sent over the network even without a terminator.

Take for instance the example in FIG. 27. Since the statement is sent one word at a time, and people generally read faster than they type, a receiving user reads each word in the statement essentially as it is typed, and when he finally reads the word 'embarrassed, he sees the avatar blush. In most chat and instant messaging products, the user would type a line, hit the return key, and then the entire line would be sent. There would be no way to time the blush (or other emotion) to match the moment in time when the user expresses it, because that time depends on how long it takes the reader to get to the end of the line.

Note that in most instant messaging systems, the user types a line, hits return, and then the line is added to the bottom of a chat window with the sender's name. The system described herein, by using the Chat Balloons as described above, provides a separate text area for each avatar, to avoid jumbling words from different speakers together.

Locality of Smiley Words

Another feature of the Smiley language is that the server does not need to know whether a word is a Smiley or not. That is, in certain embodiments, a Smiley is recognized and interpreted as an emotion upon arriving in a chat stream on a client. While Smiley-triggered emotions are not distributed, the Smiley word itself is distributed (as are all words passed into the chat stream); thus, one can rely on all clients displaying the Smiley-triggered emotion. This approach is explained further with reference again to FIG. 1.

A user on one client 2 enters a Smiley word during a simulation. The Smiley word is then transmitted over the network 3 to the server 1, where it is read by the server 1 (just as any chat word). At this point, Smiley words are not treated any differently than any other word. The server 1 then sends the Smiley word over the network 3 to all clients 2, where the Smiley word is displayed in avatar Chat Balloons. Upon arriving on a client 2, the Smiley word is parsed by client simulation software to identify the corresponding emotion from a set of possible emotions, which triggers the emotion to be played, depending on any of various factors, such as what the avatar is doing, the avatar's mood, etc.

Hierarchical Emotion Matches to Smiley Words

In certain embodiments, upon a Smiley arriving at a client, the avatar component of the client simulation software looks up the Smiley word in a series of lookup tables. These lookup tables are sorted hierarchically, and their contents can be changed dynamically, depending on context. So for instance, if a user enters 'yay, and his avatar is standing, the emotion triggered may be a jump and a back flip, but if the avatar is sitting in a chair, the avatar will play a clapping emotion.

Hiding Smileys from Others

Sometimes, a user may want to hide his Smileys from others while using Smileys to trigger emotions. For example, a user may want to use a 'coy expression while flirting without having the other user see 'coy in the Chat Balloon. Hence, by adding another special character at the end of a Smiley, e.g. 'coy', a Smiley can be hidden from other users. In that case, the speaker will be the only one who can see the Smiley word in his Chat Balloon. This technique enables the speaker to correct misspellings and to see what he is typing. In certain embodiments, as soon as the special character (') is typed at the end of the Smiley, the Smiley word turns gray, and parentheses appear around it, to indicate to the speaker that others cannot see it.

Strength of Smiley

Since human emotions have degrees of strength, the Smiley language allows Smiley-triggered avatar emotions to be varied in strength. For example, adding more special characters to a Smiley word can be used to cause a stronger response, such that for example, "smile causes a longer broader smile than 'smile, and "'smile causes a laugh.

Chat Prop Emotion Types

Targeted Emotions

Some emotions behave differently when the user has selected an avatar at which to look (see discussion of Gaze, below). For example, in the Stage Chat Prop, the presenter can only 'GiveMic when looking at an audience member. Otherwise nothing happens. In other targeted emotions when there is no recipient, the moodicon may just travel straight forward and stop about a meter in front of the sender.

Toggle Emotions

A toggle emotion is an emotion that continues until turned off. For example, when a user inputs 'HandUp while seated in the audience of the Stage Chat Prop, a 'HandDown trigger becomes available, and the hand remains up until the user triggers the 'HandDown. Thus, a toggle emotion involves two opposite and complimentary emotions that can toggle from one to the other.

Advanced Smiley Actions in Chat Props

An important purpose of Smileys is to express emotions on the pilot avatar composed of facial expressions, body gestures, etc. as described above. However, in Chat Props, Smileys can cause other, more powerful actions, such as a change in the avatar's pose, a change in another avatar's pose, or a change in another avatar's camera view, as will now be further described.

Change the Avatar's Pose

The Smiley 'kiss, when the avatar is standing, causes the avatar to blow a kiss to another avatar. When seated in a loveseat, 'kiss causes the avatar to lean toward the other avatar and kiss. If the other avatar does the same, they kiss lip-to-lip.

Change Another Avatar's Role in the Chat Prop

Figure 28:
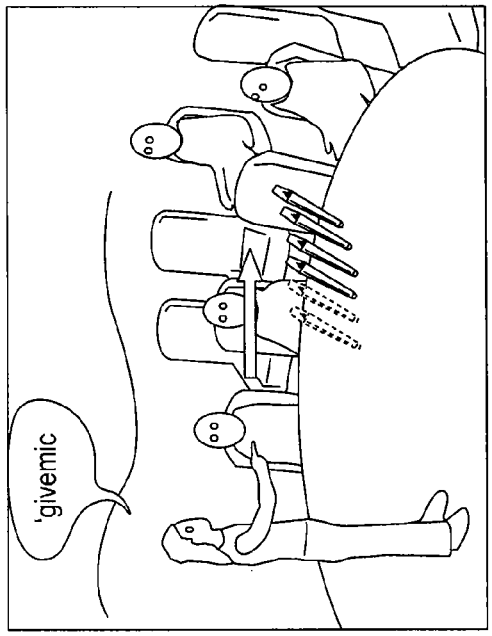
FIG. 28 shows the use of 'GiveMic to change another avatar's role in a Chat Prop.
Figure 28:
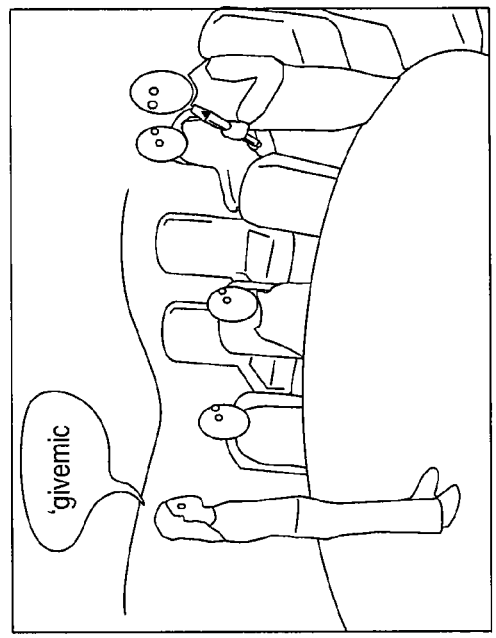
Figure 28:
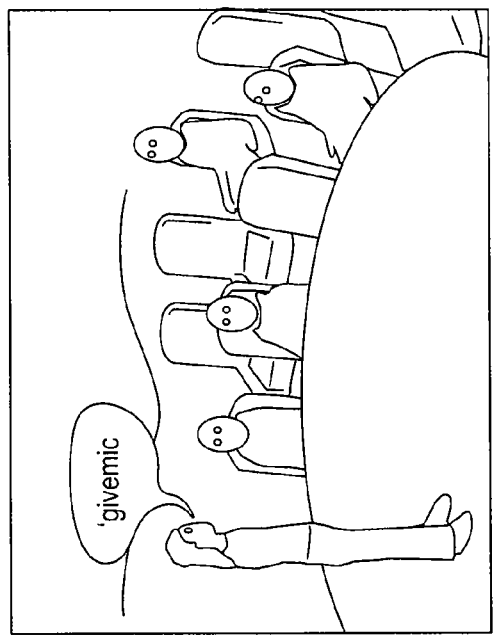

As shown in the example of FIG. 28, when standing in the world, 'GiveMic sends a microphone moodicon forward from the pilot avatar. If the pilot avatar is looking at another avatar, the microphone moodicon goes to the other avatar. However, a 'GiveMic by the Presenter on the stage looking at someone in the audience sends the microphone to that audience member. When the audience member receives the microphone, he automatically stands up and become a speaker. This new role gives the avatar different emotions with new actions.

Change another avatar's camera view

In the Stage Chat Prop, the presenter can type 'gavel (implying that the presenter is banging a gavel to get attention), which causes all audience members to look at the presenter.

Complex Timing and Time-outs

Smileys can be defined as toggle pairs that have complex time-out behavior. For example, on a loveseat, 'Kiss and 'EndKiss can comprise such a pair. When an avatar does a 'Kiss, 'EndKiss becomes available and the avatar goes into the kiss, but the kiss times out automatically after a few seconds unless it is reciprocated by another avatar. If it is reciprocated, the two avatars continue to kiss as long as they like. During the kiss, both have the 'EndKiss toggle Smiley available. When one does 'EndKiss, the other continues to kiss for a few seconds and then stops automatically.

Adding Life

Most triggered animations in games feel mechanical and shallow because they never change. To avoid this effect, emotions can automatically be varied slightly in duration, playback speed, and/or amplitude each time they occur within a range. For example, sometimes a smile lasts a few moments longer, sometimes it is slightly broader. Each repetition of an emotion can be made to differ in some small way. Of course, preferably the biggest 'smile (single-quote) is never as big as the smallest "smile (double-quote).

Overlapping Smileys/Blending Animations

If the user inputs two or more Smileys close enough together in time, their respective emotions can be blended together to produce a single blended animation. For example, a user might type "What do you mean 'smile 'confused?" which might cause a smile emotion and an emotion depicting a confused expression to be blended together, to result in a single animation of a confused smile.

B. Emotions and Gaze Inferred from Conversational Content

Chat may contain unambiguous emotional language that the user may not have typed in the Smiley language, such as "No, I don't agree." To avoid losing this opportunity for avatar body language, a simple form of language processing can be done. Specifically, the chat system scans the chat for specific words associated with emotion and gaze, stored in a lookup table. Particular attention is given to the words at the beginning of each chat statement. Words such as yes and angry, for example, trigger the appropriate emotion. The words that cause actions by this language processing may be similar to, but not exactly the same as, the words in the Smiley language. In the example, "No, I don't agree," the avatar may shake its head as this phrase appears in the Chat Balloon.

This form of language processing can also be used to recognize the name or nickname of another avatar in the conversation. When recognized, the speaker avatar can be caused to look automatically toward the avatar with that name. For example, if an avatar says, "Yes, I agree, Jeff," then the avatar nods its head and looks toward the avatar named Jeff while saying this. As another example, if the speaker avatar says the name of a second avatar, then a third avatar can be caused to look at the second avatar (as if waiting for a response from the second avatar to the speaker avatar's speech).

Mood and Avatar Behavior

While users trigger emotions both explicitly and implicitly, use of these isolated animations can make a neutral avatar between them appear lifeless. Avatar mood (simulated) and conversational movement comprise a mechanism to both fill in emotional behaviors between user-controlled expressions and add natural and intuitive emotional flavor to a number of avatar behaviors, including conversational movement, the expression of emotions, and avatar animations such as walking.

At any given time, each avatar has a mood profile including: a state representing level of happiness, a state representing level of attentiveness to other avatars in the conversation, etc. Each of these components has a value. These values can change slowly over time based on user-controlled emotions, inferred emotions, gaze, amount of chat activity, and other factors. For example, if one avatar is talking a lot, nearby avatars may appear to become more interested in that avatar. Or, if an avatar's chat contains positive expressions such as 'smile or inferred emotions such as "Yes, that's okay," then that avatar's happiness state increases.

Conversational Movement

In certain embodiments, when an avatar is otherwise idle, the avatar is always animating slightly, for example shifting its weight from side to side. This technique helps prevent the avatar from looking lifeless. To fill in the emotional state of the avatar between emotions, an idle animation that is dependent on the mood of the avatar can be used. This technique is called "conversational movement", because it more naturally reflects the emotional content of the ongoing conversation. The technique can be implemented with multiple sets of idle animations, each reflecting some mood state. At any given time, the avatar uses the set of idle animations that best represents its current mood.

Mood Affecting Other Emotive Behaviors

An avatar's mood profile is known to all avatar behaviors, so it can affect not only conversational movement, but also emotions and even avatar animations. As an example of the former, if an avatar is happier, the duration of the smile emotion caused by 'smile may be increased, its playback speed may be increased, and its amplitude increased. In other words, if the avatar is happy, then 'smile causes a bigger and longer-lasting smile.

As an example of mood affecting avatar animations, the system can provide multiple avatar walk cycle animations (e.g., some more weary, some more sprightly) and use the mood to set weighting factors to blend between these animations. In this way, the avatar's walk can be altered so that a happier avatar walks with a more upright and sprightly stride.

VI. Avatar Sentient Gaze

One of the most powerful aspects of non-verbal communication is gaze. Gaze can indicate to whom communication is being directed, who is being ignored, and how much interest there is in a person. Hence, control of avatar gaze can be used to add animated life to a virtual world.

It is desirable to add some of the more subtle and telling aspects of body language to enrich online communication, both as explicit communication (e.g., looking at the avatar being spoken to), and as sentience (e.g., automatically glancing at a new avatar entering into a group conversation). Accordingly, the techniques described below are directed mainly to social inter-avatar interactions that occur in the eyes, head, and neck when avatars look at each other while talking. This is accomplished accomplish through movement (e.g., rotations) of the eyes, head, and neck to "gaze" around the world and to focus on other avatars and other items of interest. In certain embodiments, two methods are used to do this:

1. User-Controlled Gaze—Users control their avatar's gaze direction, which is distributed across the network for shared experience.
2. Automated Gaze—Gaze which happens without direct user-control and is based on social dynamics, events in the world, and conversational dynamics. These behaviors may or may not be distributed across the network, depending on the situation.

These two methods differ in two important ways. In the former, the user explicitly controls the gaze. In the latter, which is sometimes referred to as "sentient gaze" in this document, the user does not control the gaze. The rationale for sentient gaze is that many aspects of natural gaze behavior by people is not conscious. If a real person is talking to several people and someone joins the group, he usually glances at the new person and perhaps smiles briefly in welcome. If someone says something, a person will typically look at the speaker. While these are important social gaze behaviors, they are too detailed for explicit control. Consequently, the techniques described herein accomplish this automatically.

A. User-Controlled Gaze

Gaze/Walking Direction Following 3D Camera Direction

When walking around the virtual world or standing (not in a Chat Prop), a user can move the mouse to change the pilot avatar's "goal orientation". The goal orientation is the direction the avatar attempts to look and, if the user is also pressing a movement control, to move. In certain embodiments, the goal orientation is maintained as a vector with respect to the avatar's current position.

The avatar's neck, head, and eyes attempt to aim at the goal orientation. If the direction of the goal orientation does not match the current avatar direction, the avatar's eyes are rotated toward the target immediately, then the head/neck begins moving, and finally the body moves. This approach simulates real human movement due to the different inertial constraints on the eyes, head and body.

Assuming the avatar's body only turns in the horizontal plane, the body responds only to horizontal changes. However, the eyes, head, and neck track both vertical and horizontal changes. In a Chat Prop, the body is usually fixed, so that only the eyes, head, and neck respond to goal orientation changes. Since the goal direction information is distributed, other avatars can see where each avatar is looking as well as where it is walking.

Gravity Wells—Helping to Lock onto a Point of Interest

Figure 29:
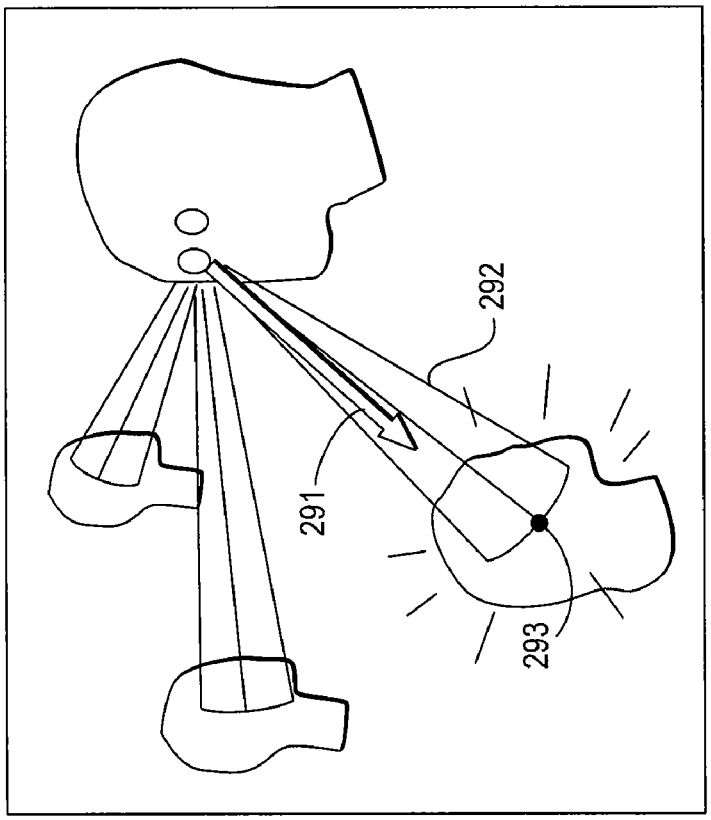
FIG. 29 illustrates the use of "gravity wells' to assist a user in controlling avatar gaze.
Figure 29:
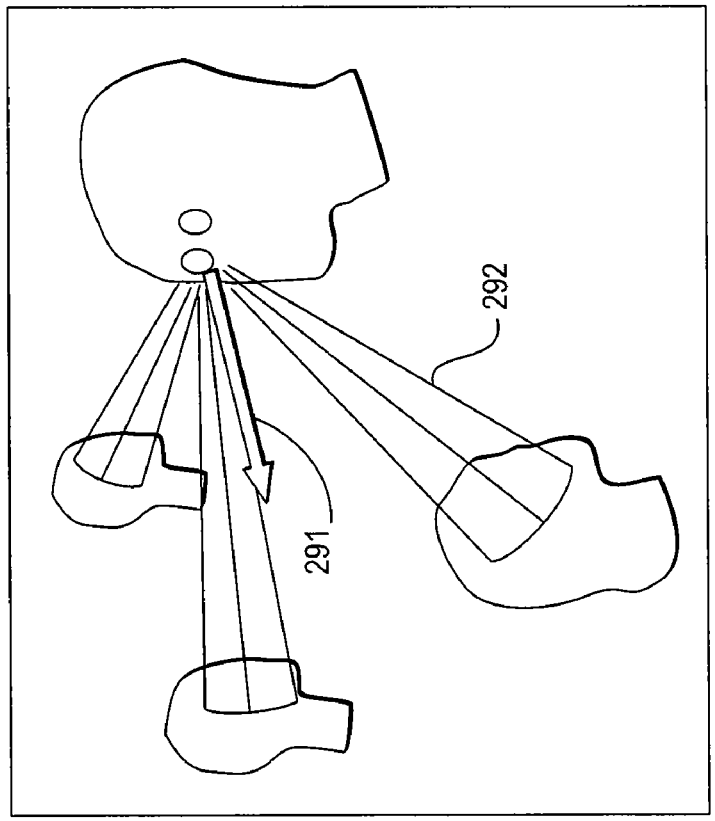

Because gaze is a powerful communication tool, a user may choose to set the goal orientation with the primary intent of directing where their avatar is looking. The user can make the pilot avatar's gaze lock onto the heads of on-screen avatars that are in front of the pilot avatar. To make this easier to accomplish, "gravity wells" can be placed around avatar heads to make them bigger targets. This technique is illustrated in FIG. 29.

When the user's gaze direction 291 enters a cone 292 around a vector originating from his avatar's head to the desired target, the goal gaze direction 291 snaps to the center 293 of the gaze target. This action signifies a target gaze lock. A visual indicator (a highlight of their nametag in the case of an avatar) an be used and a sound can be played to give the user additional feedback of the gaze lock. In certain embodiments, the selection cones 292 are actually long rectangular pyramids (similar to view frustrums) that start at the pilot avatar's head and have a fixed horizontal size and a fixed vertical size centered around the vector to the target head.

If the target avatar moves after gaze lock, the pilot avatar continues to look at the moving avatar until the user moves the mouse or the target avatar moves out of view. At that point the gaze breaks free immediately and shifts back to the location where the target was originally spotted.

User Selection of a Gaze Target

A user can explicitly select an avatar to look at in any of a variety of ways. For example, the user can use a pointing device to select an avatar by placing a cursor over the avatar and clicking on it or by placing the cursor over the avatar and selecting an item on a pop-up menu (e.g., "Look At"), or by using some other user interface control to select from among the on-screen avatars. However the target avatar is selected, the pilot avatar's gaze locks onto the target avatar until the user explicitly turns it off.

B. Automated Gaze

Many social behaviors are too detailed and on-going to be explicitly controlled by a user. There are countless automatic and often unconscious behaviors that add a sense of life and body language to human communication. The automated ("sentient") gaze technique simulates this phenomenon—when the user is not explicitly controlling his avatar's gaze, the avatar displays sentience in its gaze behavior. In general, this allows an avatar's gaze to be controlled automatically based on conversational acts of avatars, such as such as avatar speech, facial expressions, body gestures, or moodicons. Several types of automatic gaze behaviors will now be described.

Context-Dependent Settings

Many sentience gaze settings, such as durations, statistical chances, angular thresholds, etc., can be set (through use of, for example, a scripting environment), to allow avatars to respond differently in different situations, such as when in an Auto-Chat Prop or Chat Prop. Some examples are as follows:

Avatar A momentarily looks at avatar B if the user of avatar B types the name of avatar A in B's Chat Balloon.

The avatars in a Chat Prop glance at a new avatar joining the Chat Prop and then return to where they were previously looking.

When a user types text rapidly (above a tunable words-per-minute threshold), other avatars are more likely to gaze at that user's avatar. This is a local effect and an example of Subjective Social Gaze (described below).

When the gaze system is otherwise idle, an avatar looks around at random avatars and other things of interest.

When the gaze system is otherwise idle, an avatar looks at random positions in front of its head (with head rotations separate from eye rotations) to simulate the behavior of looking at "nothing in particular".

Figure 30:
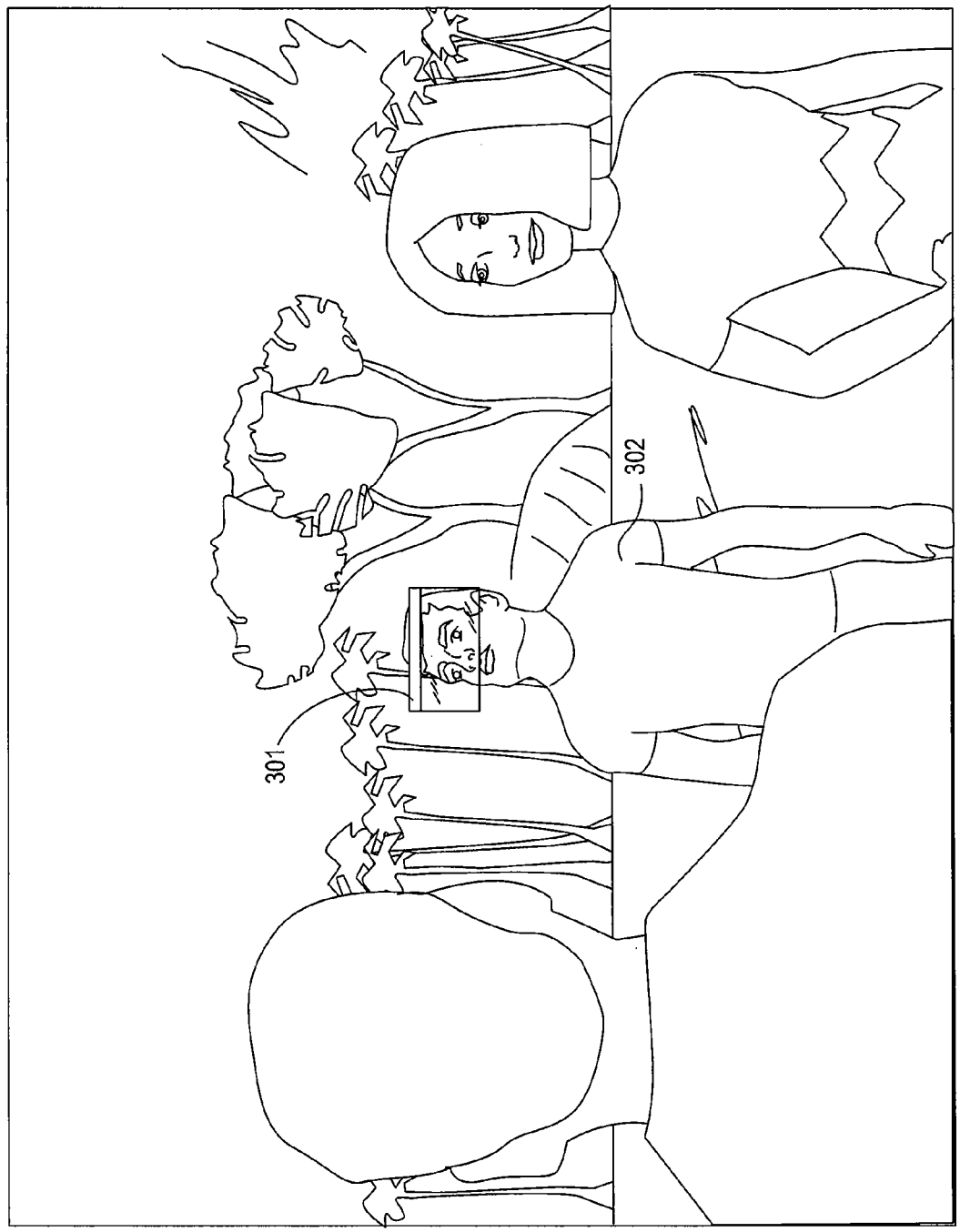
FIG. 30 illustrates an example of a screen display indicating that a user is currently interacting with a graphical user interface and not paying attention to the virtual world.

When the user is looking at a window, dialog box, or other non-3D GUI element on the screen that covers the pilot avatar's face, the pilot avatar gaze is turned off and a small screen appears in front of the avatar's face, as displayed to other users, as an indication to other users that the user is not paying attention to the virtual world. This feature is shown in FIG. 30, where screen 301 covers the face of avatar 302 when the user of avatar 302 is interacting with his GUI.

While interacting with an object of interest, an avatar automatically gazes at that object (for instance, the avatar looks at a dog while petting it).

Mood and interest levels affect blink rate, blink duration, and gaze behavior.

Gaze can be interrupted or overridden (through use of a scripting environment, for example). Examples include avatar actions and animations that demand specific pre-defined head rotations. Also, depending on the situation, an avatar's gaze may be switched to a new target of interest. For instance, while sitting in a bench Chat Prop, if the user causes the avatar to lean forward, the gaze may switch from a partner avatar (sitting on the other side of the bench) to an object of interest directly in front of the bench.

Gaze Priority

The direction in which an avatar looks can be determined by several inputs, each with a relative priority. If a higher priority input is not active, then lower-priority inputs affect the avatar's gaze direction. If the target of a particular input source is no longer "visible" to the avatar, then it becomes inactive. "Visible" can be determined by whether the target falls within a tunable rectangular pyramid based on and cast in the direction of the avatar's spine orientation.

In one embodiment of the invention, these input sources include the following (in order of priority):

| Priority and Type of Input | Effect when in a Chat Prop | Effect when not in a Chat Prop |
|---|---|---|
| 1. Mouse-Driven Gaze | Specifically distributes moodicon target, triggers target highlight, changes goal orientation | Moves camera and head up/down, left/right movement moves body, but head leads |
| 2. Chat Prop-based Gaze | Specifically distributes moodicon target and triggers target highlight | N/A |
| 3. Name-driven LookAt | Local LookAt | N/A |
| 4. Avatar joining Chat Group LookAt | Local LookAt | N/A |
| 5. Interest driven avatar LookAt | Local; based on avatars who are actively typing, favoring the pilot as a target | N/A |
| 6. Random nearby LookAt | Local LookAt | Active |
| 7. Random position gaze | Local LookAt | Active |

Objective Gaze vs. Subjective Gaze

When the user selects a gaze target with the mouse, that gaze behavior is distributed across the network so that it can be seen on every user's screen. Gaze distributed in this way is called "Objective Gaze". In some embodiments, only mouse-driven and Chat Prop-based gaze are Objective Gaze.

Other gaze behaviors are computed locally for all avatars on each user's machine, and therefore are not (necessarily) the same on different users' screens. This type of gaze is called "Subjective Gaze". Subjective Gaze is designed to enhance each user's experience by causing gaze behavior that favors that user on his machine. The difference in the gaze behavior seen on any two users' screens can be tuned specifically to accentuate each of those user's subjective social experience.

Mouse-Driven Gaze

In a Chat Prop or Auto-Chat Prop, mouse-driven gaze gives the user the ability to move the pilot avatar's head explicitly and to have remote users reliably see this. When not in a Chat Prop, the mouse sets the goal orientation for the avatar. The avatar turns its entire body to face the goal orientation, but the head turns somewhat faster than the body. The normal goal orientation network distribution mechanism can be used to send out this information.

Chat Prop-based Gaze

Chat Props and Auto-Chat Props can have the ability to rotate the pilot avatar's head in any direction within anatomic constraints and to set gaze targets. This can also be distributed across the network so all users reliably see this.

Name Driven LookAt

When a user types another avatar's name in an Auto-Chat Prop or Chat Prop that he has joined, the avatar with that name looks at the user. This gaze action would usually be seen on all machines, but if two such occurrences conflict, each user sees the gaze that favors him on his screen.

Avatar Join LookAt

When an avatar joins a Chat Prop, all of the other avatars glance at me briefly. This can be accompanied by a facial recognition emotion or friendly gesture. This would usually be seen on all users' machines, but if two such occurrences conflict, each user sees the glances toward his avatar on his screen.

Random Idle LookAts

Random nearby LookAt is a facility that allows an avatar to look around for other presences that have a head (avatars, dogs, etc). In certain embodiments, this occurs only when no higher priority gaze behavior is occurring.

Random Look Around

In the absence of anything of interest to look at or any explicit user control, an avatar can look around randomly. The target is a random position in front of the avatar defined by a yaw and pitch angle offset.

VII. Software Architecture

FIG. 3 is a block diagram of software, on both a client 2 and on a server 1 (see FIG. 1), to implement the avatar-related features and techniques described above. In the illustrated embodiment, the server software includes a chat system 312 to distribute chat across the network and a world simulation 313. The world simulation 313 includes a Chat Prop system 314 to generate Chat Props.

The client software includes an avatar control system 316 to control operations such as avatar gaze, pose and emotions; a user input unit 317 to detect user inputs from the graphical user interface, mouse movements, text chat, and actuation of keyboard keys; a local view manager 318 to manage the display on the local machine; an emotion parser 319 to detect and identify distributed emotions; a Chat Balloon display unit 320 to control local display of Chat Balloons, a cinematographer unit 321 to control views and camera behavior; and Chat Balloon priorities data 322.

The interactions between components in FIG. 3 are as follows (with the interactions listed as labeled in FIG. 3):

a. Chat is typed on a client 2 and sent to the chat system 312 on the server 1 for distribution to all clients 2.

b. Chat is sent to the emotion parser 319 in each client 2 for language processing for Smiley and inferred emotions.

c. Text and Smileys for Chat Balloons is sent from the emotion parser 319 to the Chat Balloon display unit 320.

d. The emotion parser 319 causes avatar emotion expression and affects interpretation of pose, gaze, and conversational movement.

e. The local view manager 318 controls the cinematographer unit 321 based on local user input and inputs from the server Chat Prop system 314.

f. The server Chat Prop system 314 determines default Chat Balloon priorities 322.

g. The cinematographer unit 321 can override default Chat Balloon priorities 322 based on the current camera view.

h. Chat Balloon priority determines appearance, location, and dynamics of Chat Balloons i. User inputs received through user input unit 317 determine distributed pose and gaze choices in the world simulation 313 on the server.

j. The Chat Prop system 314 in the world simulation 313 distributes avatar pose to clients.

k. Avatar pose can dictate view.

l. View can dictate avatar pose.

m. Local user input provides default view choices for the local view manager 318.

n. The server world simulation 313 of Chat Prop can override local view choices in the local view manager 318 (e.g., change of appearance in the Spa can change available views).

o. The Chat Prop system 314 in the world simulation 313 notifies clients of distributed gaze, which overrides local gaze behavior.

It will be recognized that many of the interactions listed above occur concurrently.

Thus, a method and apparatus for avatar-centric communication, expression and display during a multi-user online simulation have been described. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

The invention claimed is:

1. A method of displaying a user-specified conversation involving a plurality avatars in a simulation environment during a simulation in which each of a plurality of users participate, each of the users using a separate one of a plurality of processing systems on a network to control a separate one of the avatars, the method comprising:

storing data defining a prop to facilitate the user-specified conversation between the avatars, the prop including
  a plurality of associated slots, in proximity to each other, at which an avatar can be placed to facilitate the conversation, and
  a plurality of viewpoints in proximity to the plurality of associated slots and defined relative to the prop, each of the viewpoints to provide a view during the simulation, at least one of the viewpoints to provide a view directed to one of the slots; and placing the prop in the simulation environment during the simulation;

placing each of the plurality of avatars in a separate one of the slots in the prop during the simulation;

generating a view of a first avatar controlled by a first user from a first viewpoint of the plurality of viewpoints during the simulation; and automatically changing the view from the first viewpoint to a second viewpoint of the plurality of viewpoints, in response to a user-initiated action of a second avatar controlled by a second user, where the second viewpoint differs from the first viewpoint in field of view or distance to subject or both, such as to give the second viewpoint a different zoom from the first viewpoint, to emphasize an element of non-verbal avatar communication.

2. A method comprising:

generating a view of a first avatar from one of a plurality of selectable viewpoints, during a simulation in which a plurality of users participate, each of the users using a separate one of a plurality of processing systems on a network to control a separate one of a plurality of avatars, wherein the first avatar is controlled by a first user, and wherein said generating includes causing the first avatar to be displayed to a second user in a first pose, the second user controlling a second avatar in the simulation;

detecting user input that specifies a change in viewpoint, from the first user; and automatically changing a pose of the first avatar, as displayed to the second user, in response to the user input from the first user that specifies the change in viewpoint;

including causing the first avatar to be displayed to the second user in a second pose in response to the user input, wherein the second pose differs from the first pose in a characteristic including a hand or body movement or gesture of the first avatar excluding the first avatar's head or eye position.

* * * * *